(12) United States Patent
Kolawa et al.

(10) Patent No.: US 8,032,863 B2
(45) Date of Patent: Oct. 4, 2011

(54) SYSTEM AND METHOD FOR GLOBAL GROUP REPORTING

(75) Inventors: Adam K. Kolawa, Bradbury, CA (US);
Wendell T. Hicken, La Verne, CA (US);
Arthur R. Hicken, Upland, CA (US);
Marek Kucharski, Krakow (PL);
Marek Michal Pilch, Duarte, CA (US)

(73) Assignee: Parasoft Corporation, Monrovia, CA (US)

( * ) Notice: Subject to any disclaimer, the term of this patent is extended or adjusted under 35 U.S.C. 154(b) by 1630 days.

(21) Appl. No.: 11/282,542

(22) Filed: Nov. 17, 2005

(65) Prior Publication Data
US 2006/0123389 A1   Jun. 8, 2006

Related U.S. Application Data

(60) Provisional application No. 60/629,134, filed on Nov. 18, 2004.

(51) Int. Cl.
*G06F 9/44* (2006.01)
(52) U.S. Cl. ........ 717/124; 717/127; 717/128; 717/131; 717/133

(58) Field of Classification Search .................. None
See application file for complete search history.

(56) References Cited

U.S. PATENT DOCUMENTS 6,721,941 B1 *  4/2004  Morshed et al. ............. 717/127
7,099,879 B2 *  8/2006  Tacaille et al. ............... 707/737

* cited by examiner

*Primary Examiner* — Chuck Kendall
(74) *Attorney, Agent, or Firm* — Christie, Parker & Hale, LLP

(57) ABSTRACT

A system and method for collecting and correlating information about development of a computer software, including software tools reports. The system and method provides overview of entire software development lifecycle, provides decision support engine for project management, allows estimation of project timelines based upon empirical data, allows evaluation of project quality based upon empirical data, and correlates information from previous projects to estimate progress of current project (confidence factors). The system and method for collecting and correlating information about development of a computer software include collecting data from a plurality of software tools during each point in lifecycle of the computer software; storing the collected data in a database; and correlating the stored collected data to monitor the development of the computer software.

38 Claims, 25 Drawing Sheets

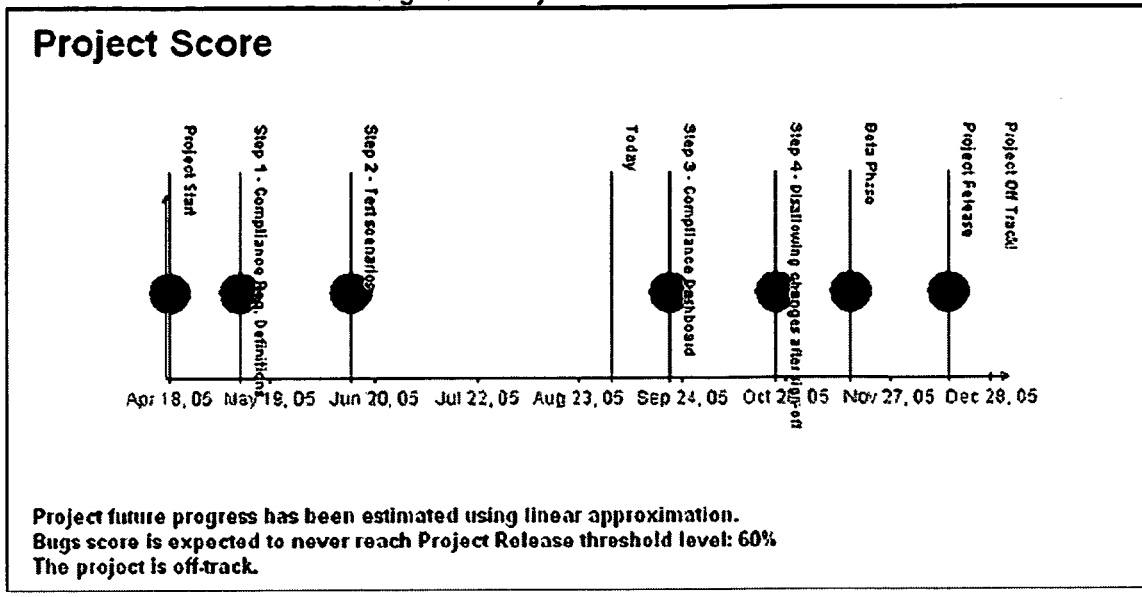
Figure 5: Project Score Timeline

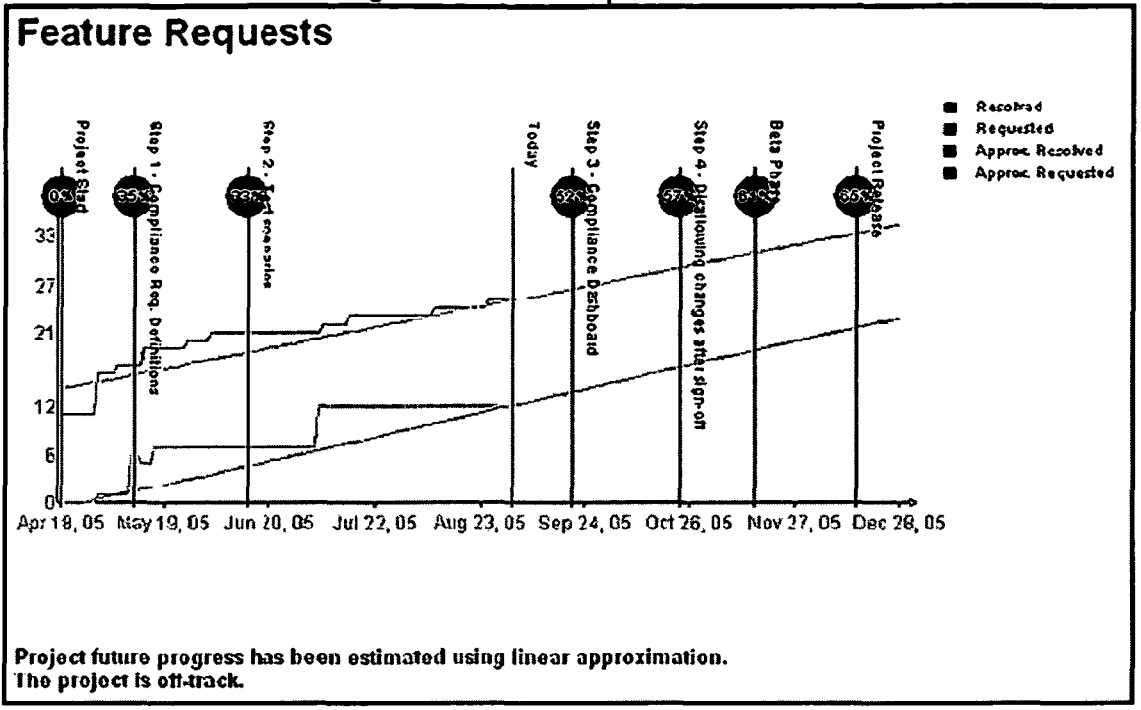
Figure 6: Feature Requests Timeline
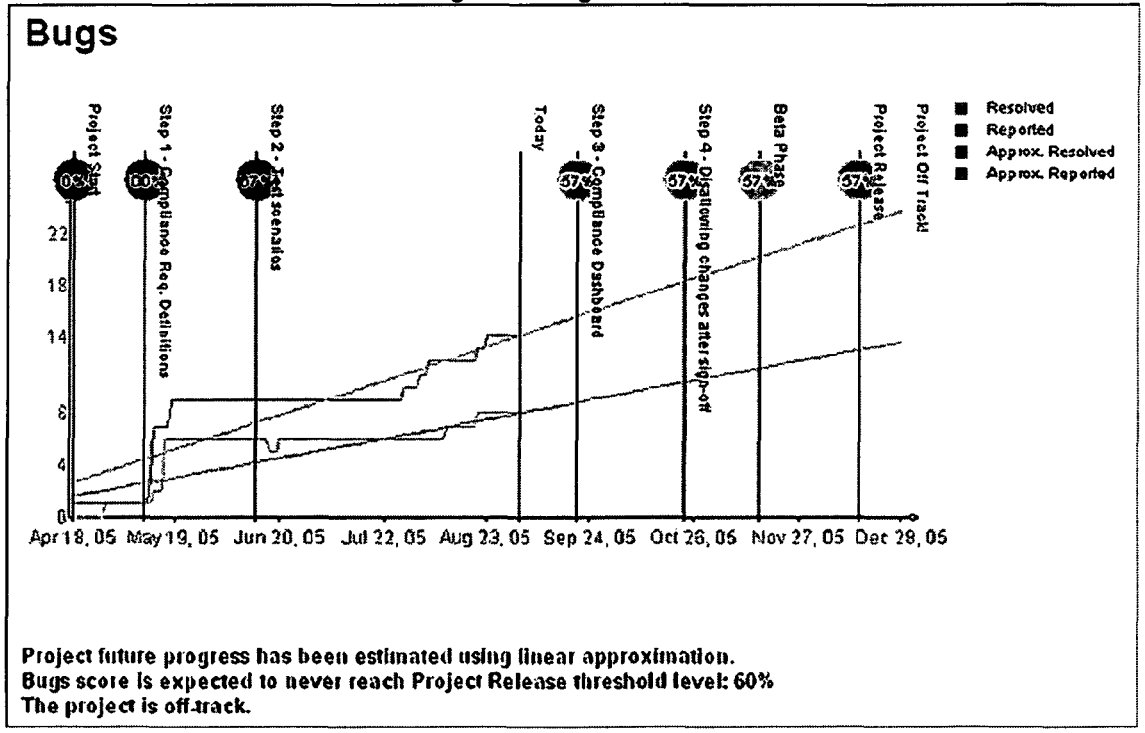
Figure 7: Bugs Timeline

Figure 10: Confidence Factor Details - Summary Information

Coding Standards CF Details

Summary information:

Date: 2005-06-21

Confidence Factor: 82.86%

Rules failed: 6

Total rules used: 35

Failed rules:

92 Row(s) Found

| Rule Category | Rule ID | File name | Line | Developer |
|---|---|---|---|---|
| Javadoc Comments | JAVADOC.MRDC | AbstractCFDetailsStorage.java | 104 | N/A |
| Javadoc Comments | JAVADOC.MRDC | AbstractCFDetailsStorage.java | 97 | mtrushin |
| Javadoc Comments | JAVADOC.MRDC | FileInfo.java | 117 | dario |
| Javadoc Comments | JAVADOC.MRDC | Resource.java | 32 | roberts |
| Javadoc Comments | JAVADOC.MRDC | SourceControlCFDetailsProcessor.java | 454 | N/A |
| Javadoc Comments | JAVADOC.MRDC | SourceControlCFDetailsProcessor.java | 267 | kerek |
| Javadoc Comments | JAVADOC.PARAM | AbstractCFDetailsStorage.java | 97 | N/A |

Figure 11: Code Base Size Graph

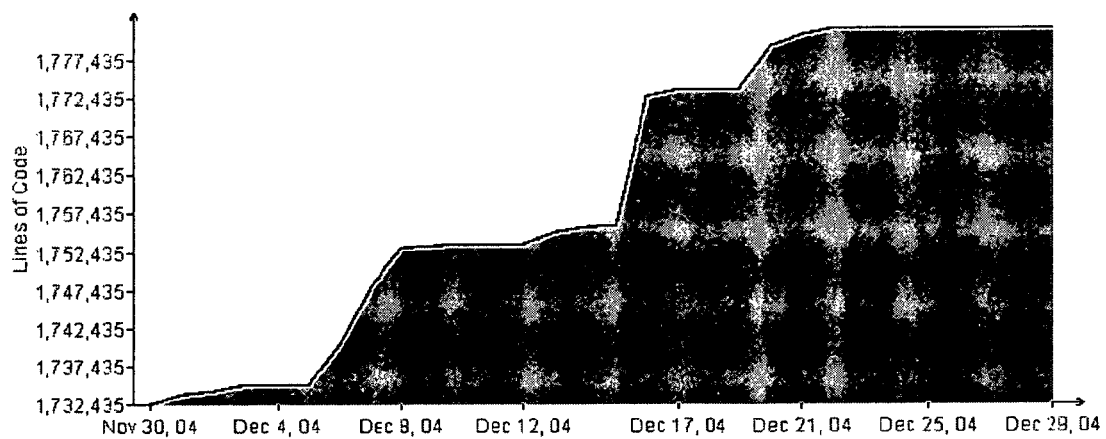

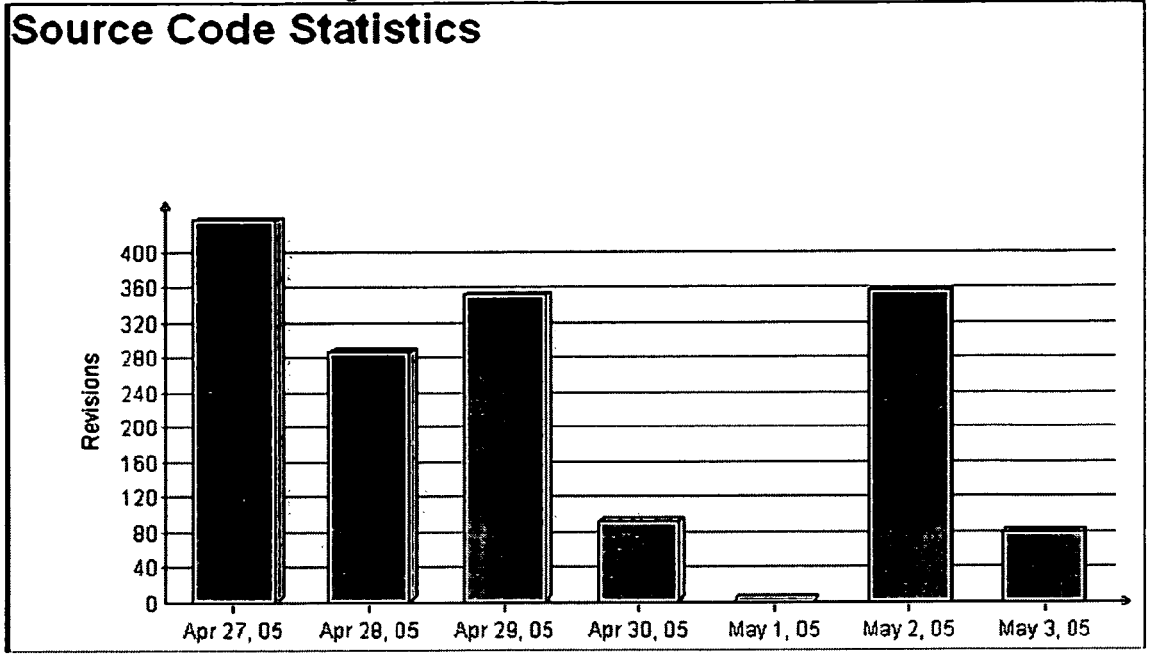

Figure 12: Source Code Statistics Graph

Figure 13: Source Control Summary

Source Control Summary

From: 4/28/05
To: 5/4/05
File Updates: 1267
Lines Changed: 142877 ( -54877/+88000)
Tokens Changed: 179955 ( -63828/+116127)

Files Directories

File Updates

| File | 4/28/05 | 4/29/05 | 4/30/05 | 5/1/05 | 5/2/05 | 5/3/05 | 5/4/05 | Total |
|---|---|---|---|---|---|---|---|---|
| BPELMaestro/icons/check.gif | 1 | - | - | - | - | - | - | 1 |
| alex/common/options.cc | - | 1 | - | - | - | - | - | 1 |
| alex/include/options.h | 1 | - | - | - | - | - | - | 1 |
| com/libs/rulewizard/OutputSchemaView.java.no | - | 1 | - | - | - | - | - | 1 |
| com/libs/rulewizard/UDDIOptionsPanel.java.no | - | 1 | - | - | 1 | - | - | 2 |
| com/parasoft/bpel/BpelUtil.java | - | 1 | - | - | - | - | - | 1 |
| com/parasoft/bpel/Constants.java | - | 1 | - | - | - | - | - | 1 |
| com/parasoft/bpel/design/diagrams/deployment.xml | - | 1 | - | - | - | - | - | 1 |
| com/parasoft/bpel/distrib/GlobalResources.xml | - | 1 | - | - | - | - | - | 1 |

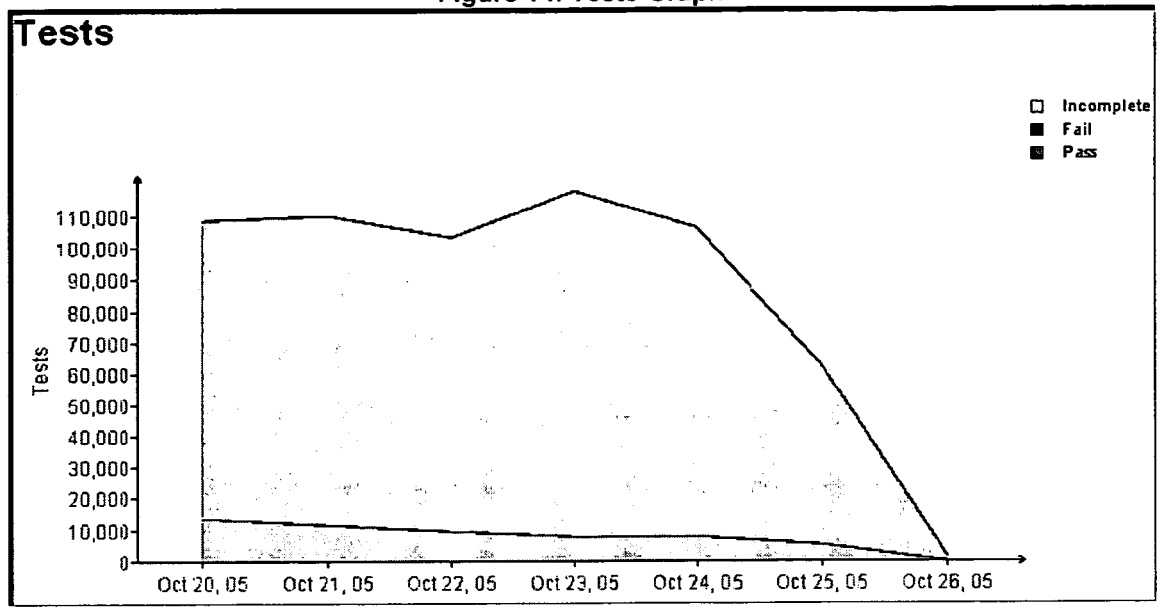
Figure 14: Tests Graph
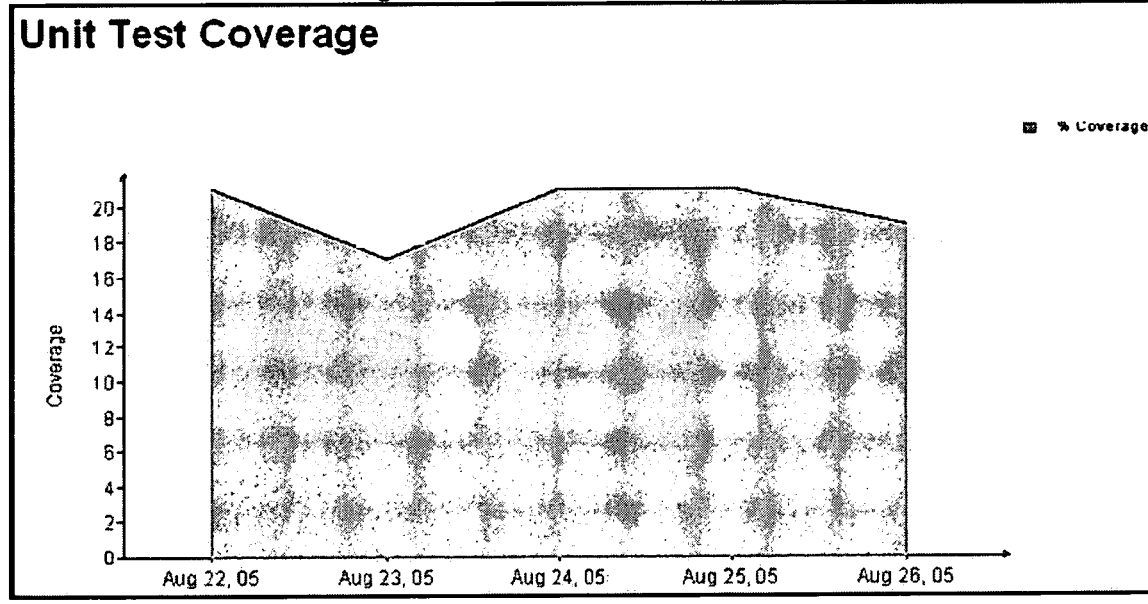
Figure 15: Unit Test Coverage Graph

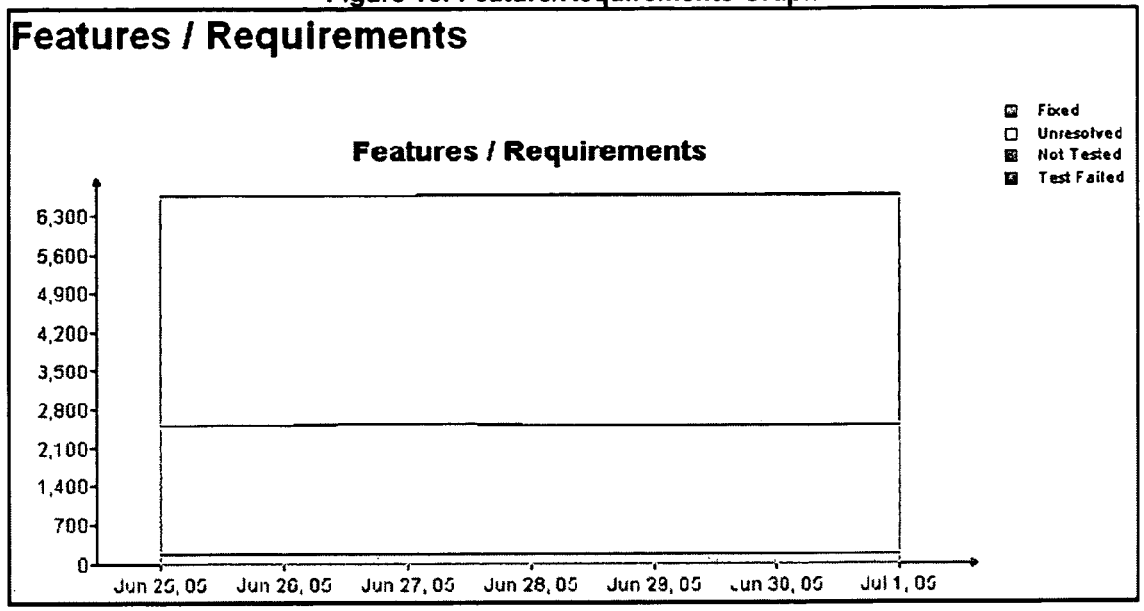
Figure 16: Feature/Requirements Graph
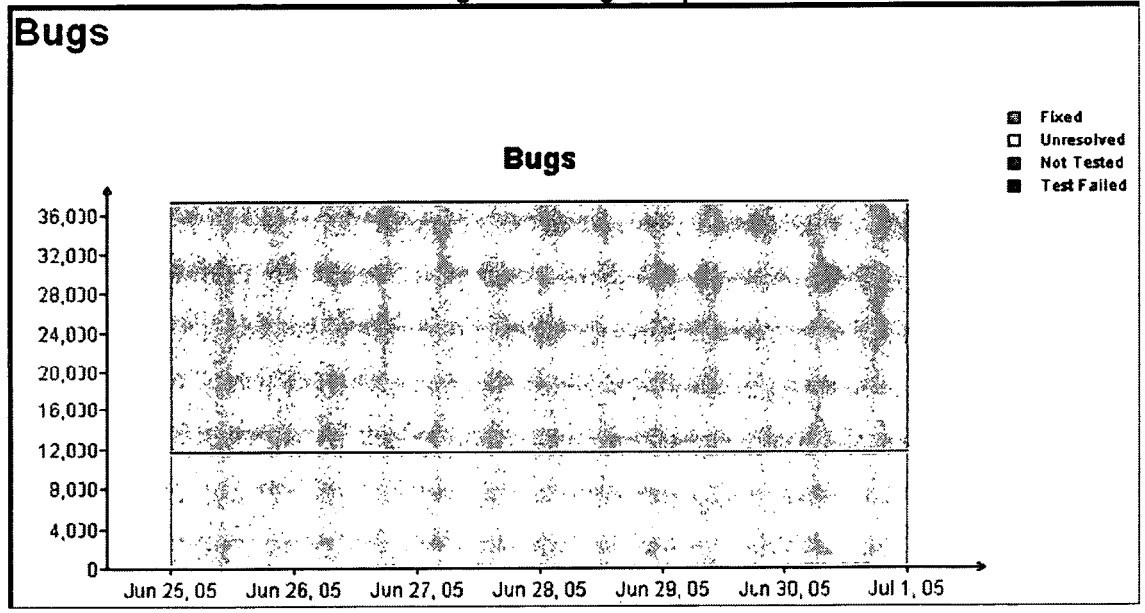
Figure 17: Bugs Graph

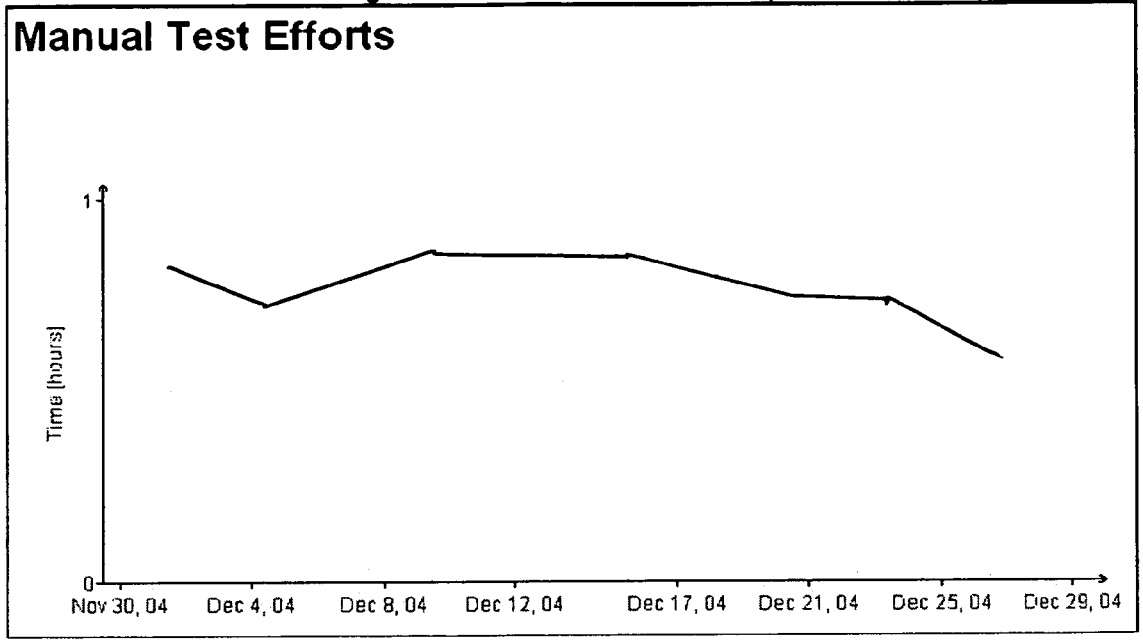
Figure 18: Manual Test Efforts Graph
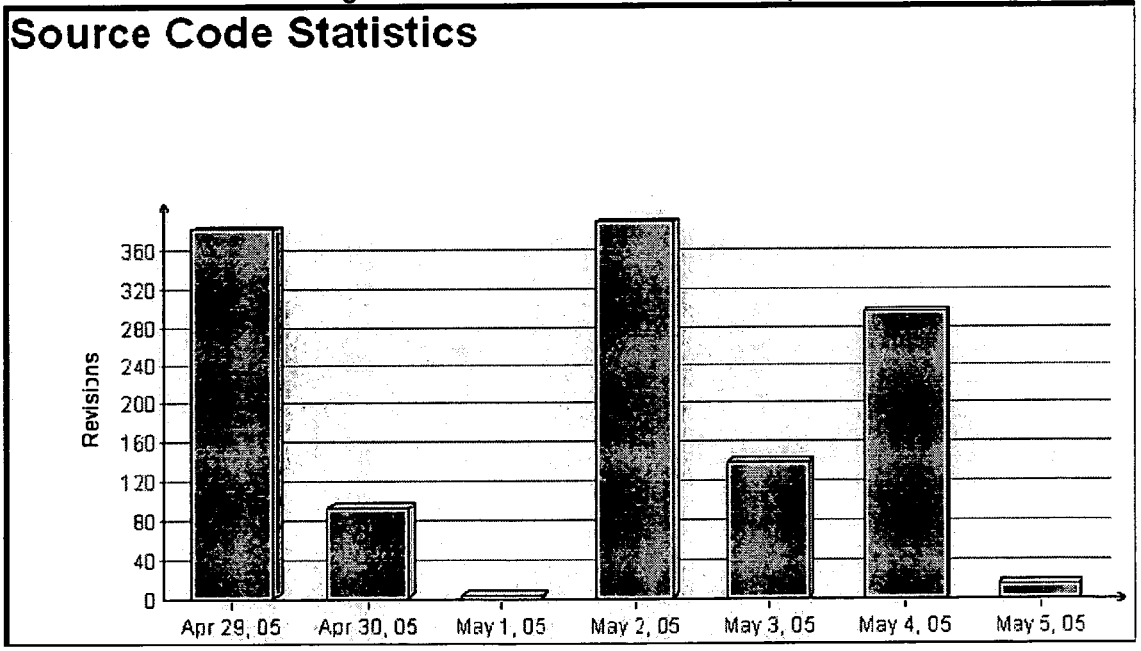
Figure 19: Source Code Statistics Graph

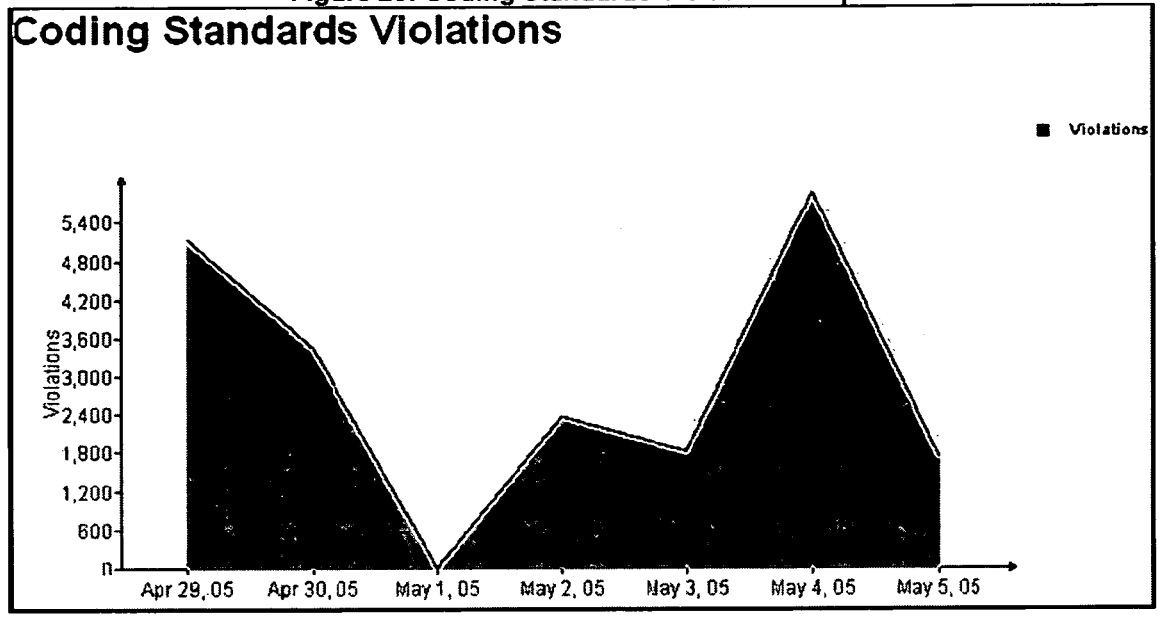
Figure 20: Coding Standards Violations Graph
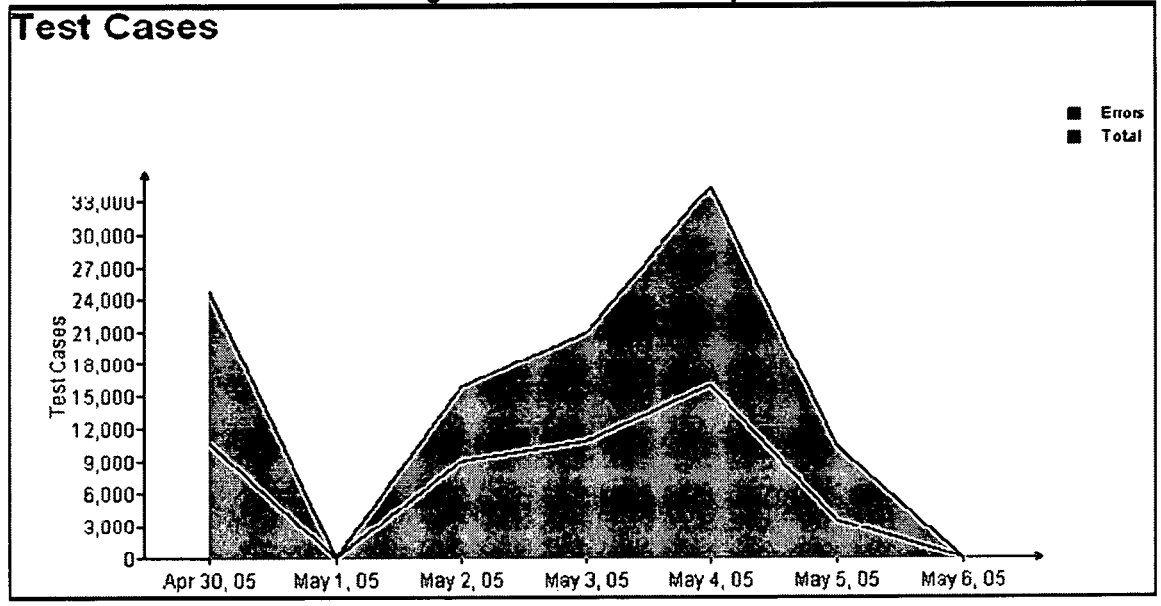
Figure 21: Test Cases Graph Figure 22: Unit Testing - Test Cases Detailed Report

Unit Testing - Test Cases Detailed Report

Summary

| Test Case ID # | Files | Users | Runs for Error Type: All | |
|---|---|---|---|---|
| | 10583 | 1231 | 27 | 10583 |

Details

| Test Case ID | File Name | Developer | Tests | Error Type | Count | % File Coverage |
|---|---|---|---|---|---|---|
| 0x268d33b1cb82bc24 | AboutBox.java | dstover | 1 | Unverified Failure | 1 | 95 |
| 0x6c6295d48e633e7a | AboutBox.java | dstover | 1 | Unverified Failure | 1 | 95 |
| 0xd4097ec69eb42781 | AbstractDiffer.java | devtest | 1 | Profiling Problem | 1 | 60 |
| 0x1ca16b8a903b4ae6 | AbstractLoadGraph.java | jakubiak | 1 | java.lang.ArrayIndexOutOfBoundsException | 1 | 49 |

Figure 23: Most Recent Results

Most Recent Results:

Summary report

Last Run: May 04, 2005

| Developer | Coding Standards Violations | Unit Testing Errors |
|---|---|---|
| ahicken | 158 | 163 |
| asmolen | 4 | 124 |
| baranov | 600 | 1344 |
| chad | 4 | 79 |
| daniel | 1 | 1 |
| default | 1 | 0 |
| devtest | 0 | 1485 |
| dstover | 664 | 1335 |
| elin | 6 | 13 |
| jakubiak | 2703 | 4135 |
| jamesta | 26 | 125 |
| jchen | 53 | 467 |
| jeehongm | 723 | 3684 |
| jhendrick | 12 | 110 |
| jim | 219 | 1010 |
| jwilkes | 0 | 1 |
| kuba | 0 | 2 |
| leif | 5 | 37 |
| marat | 0 | 77 |
| marcosk | 0 | 5 |

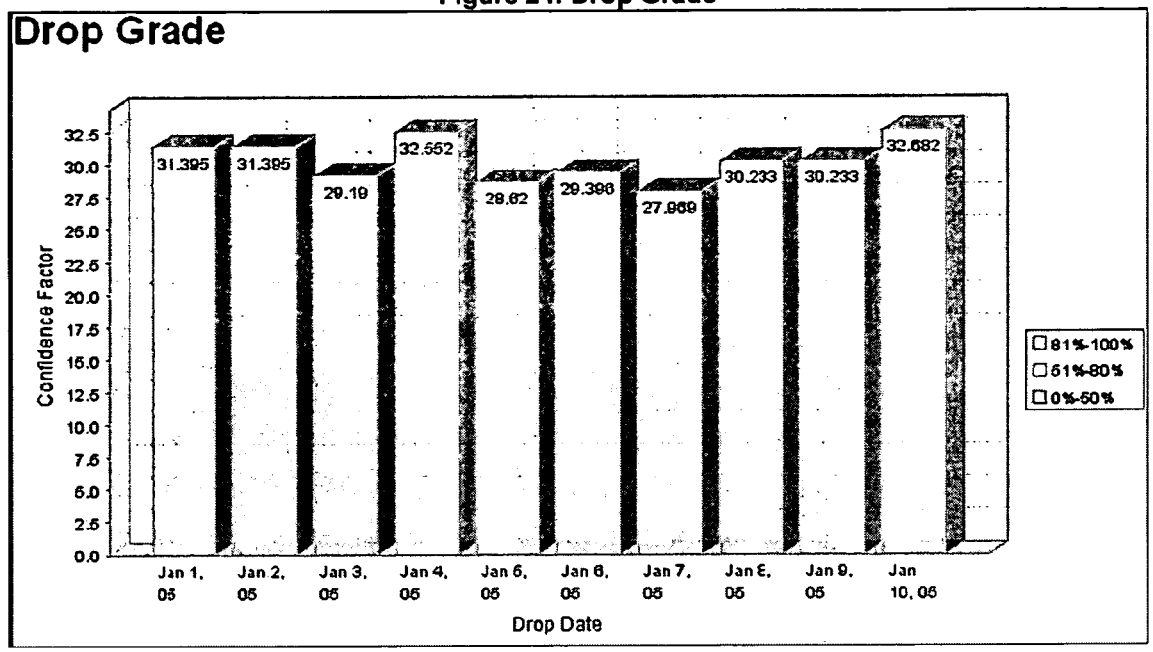
Figure 24: Drop Grade
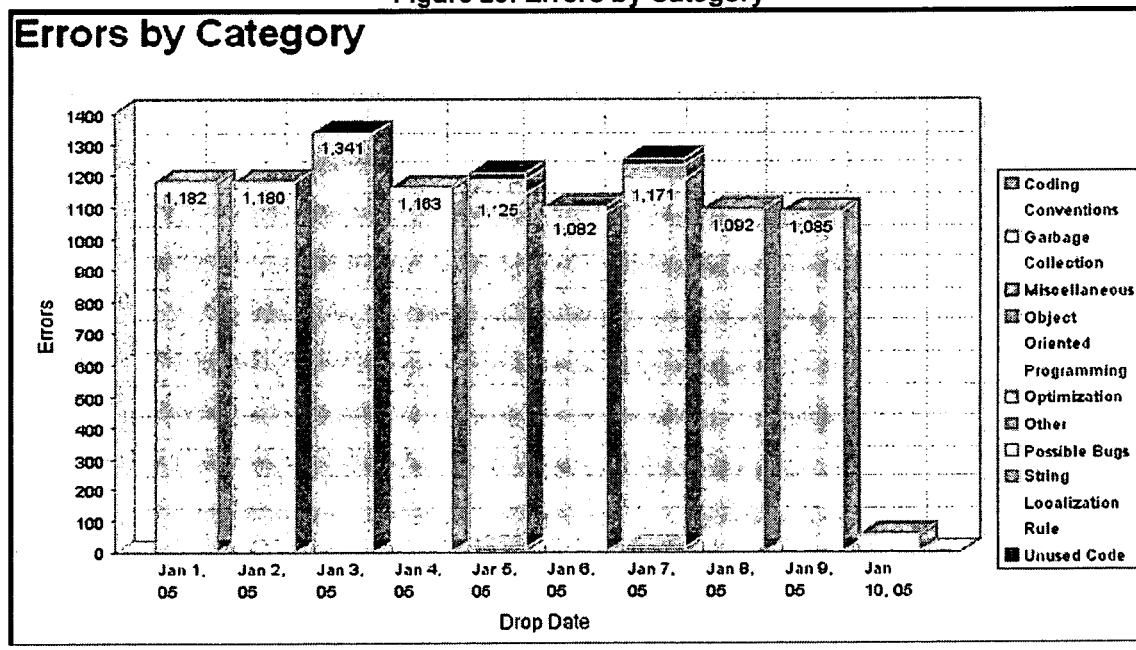
Figure 25: Errors by Category

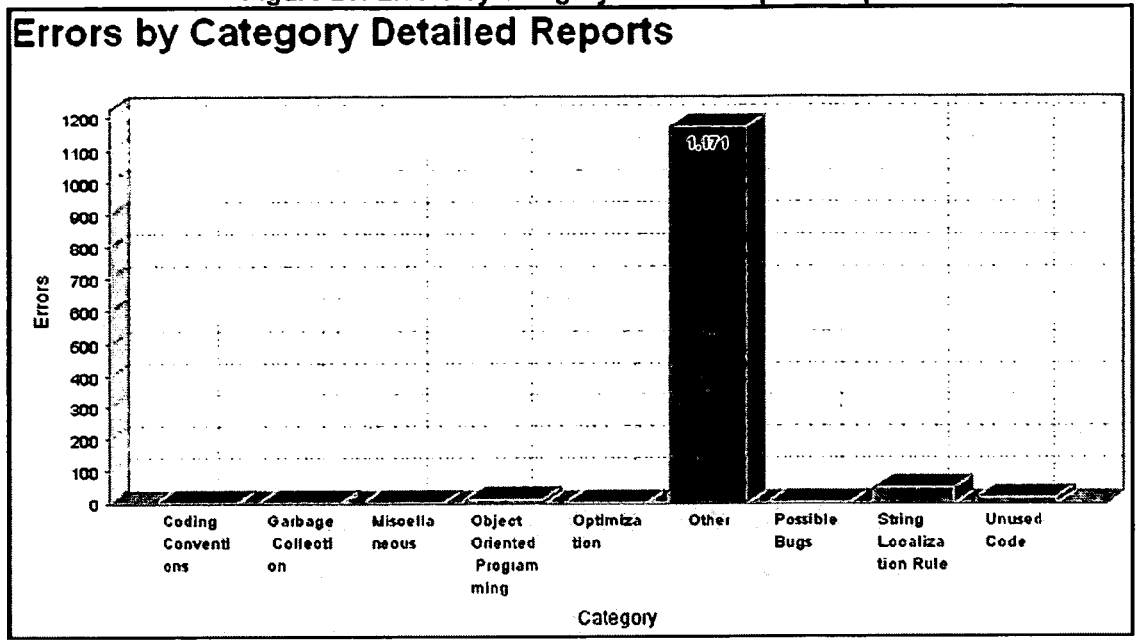
Figure 26: Errors by Category Detailed Report Graph
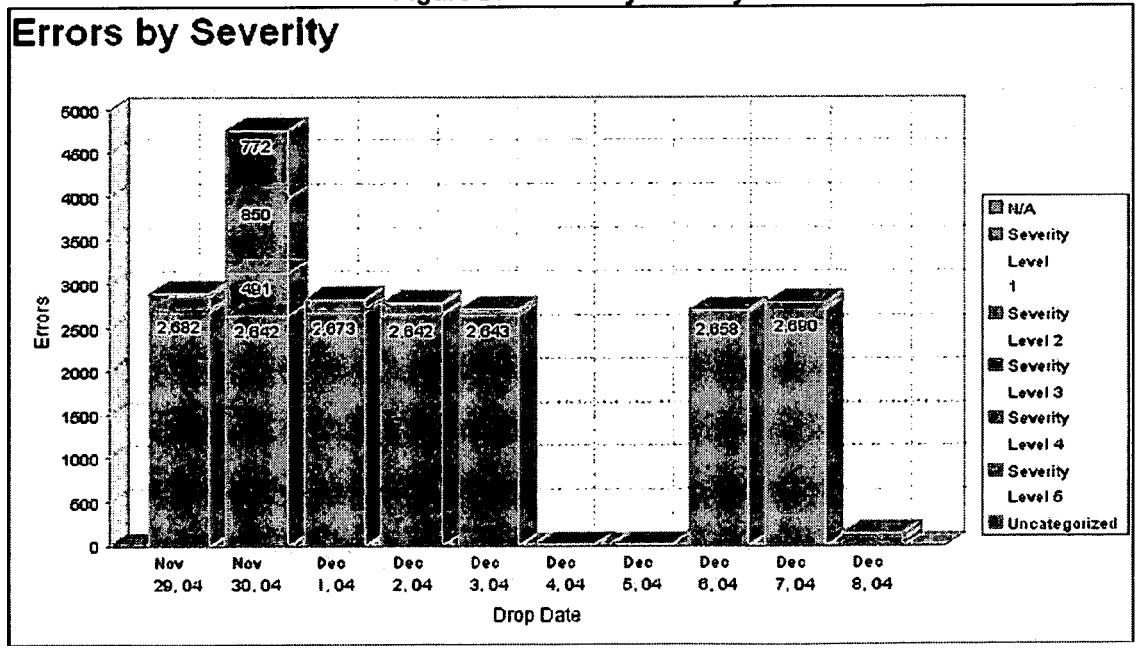
Figure 27: Errors by Severity

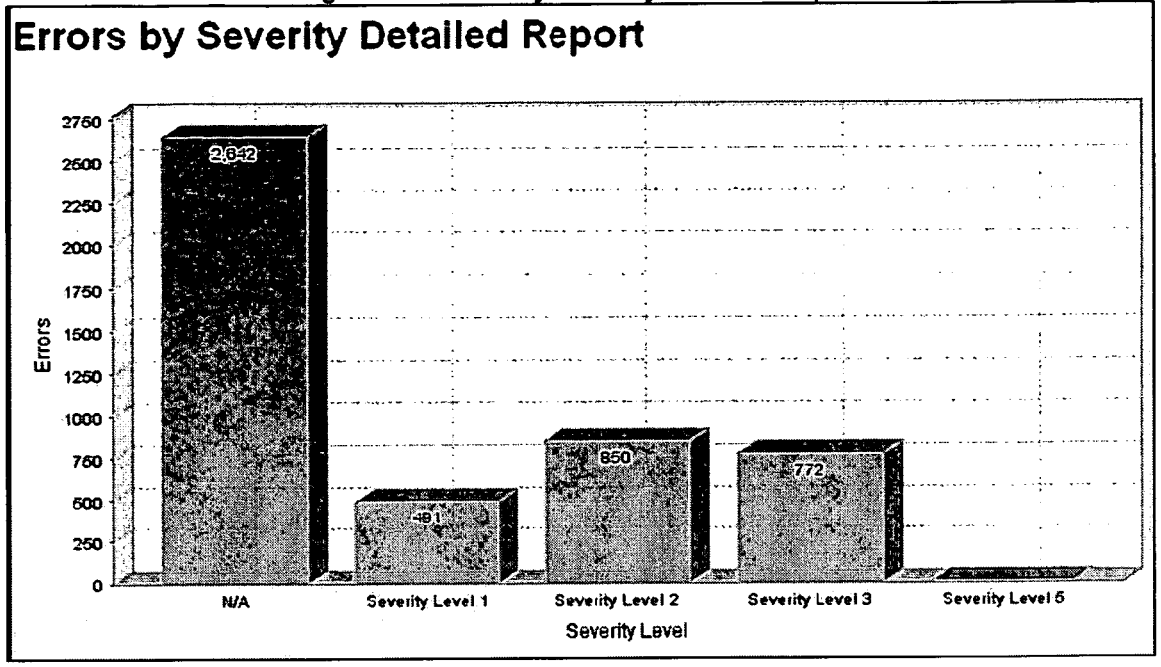
Figure 28: Errors by Severity Detailed Report

Figure 29: Coding Standards Violations by File
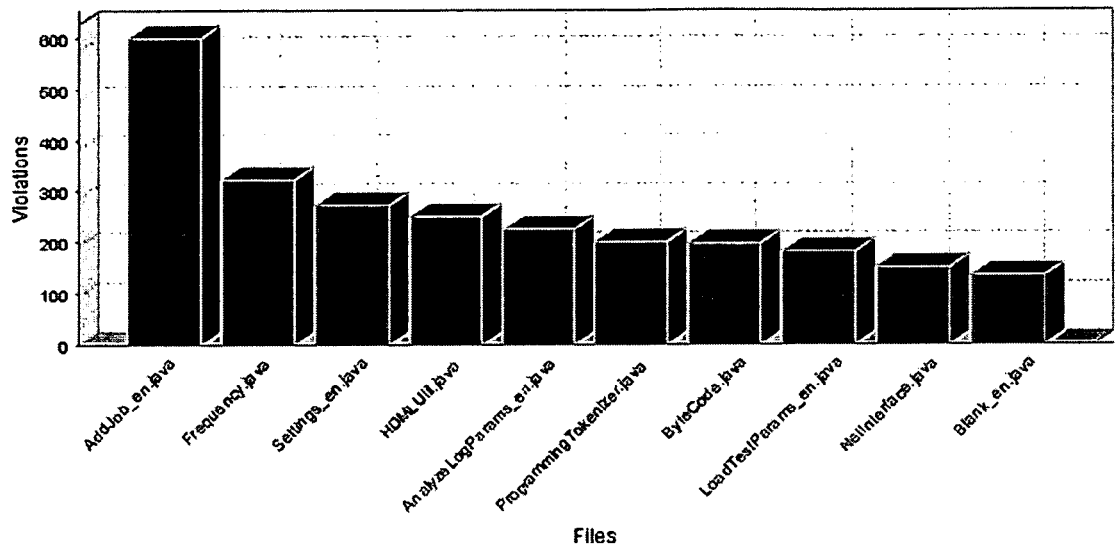

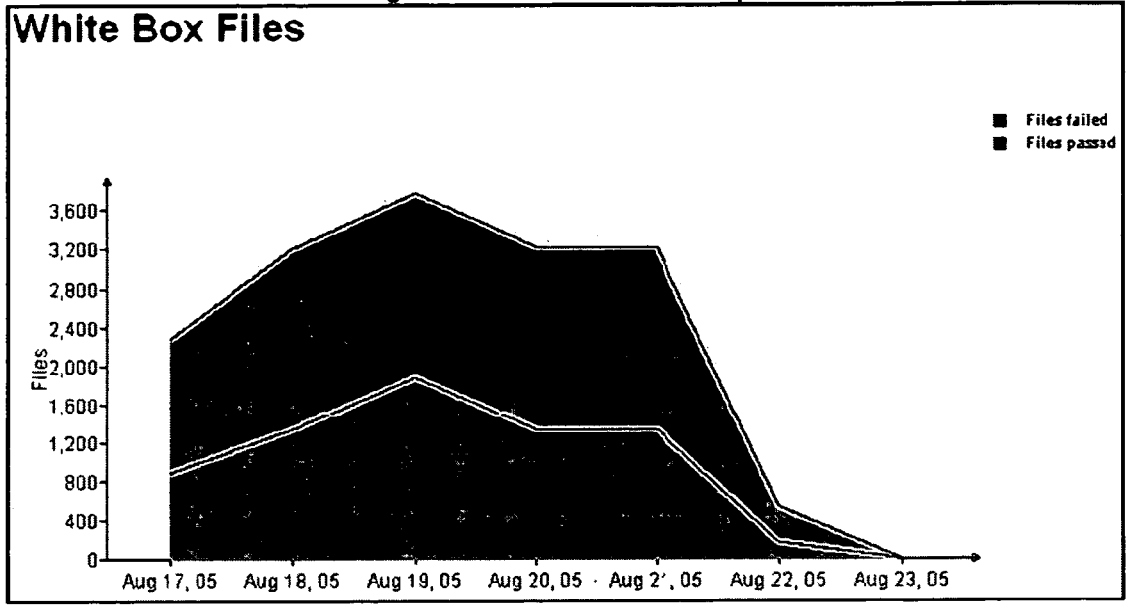
Figure 30: White Box Files Graph
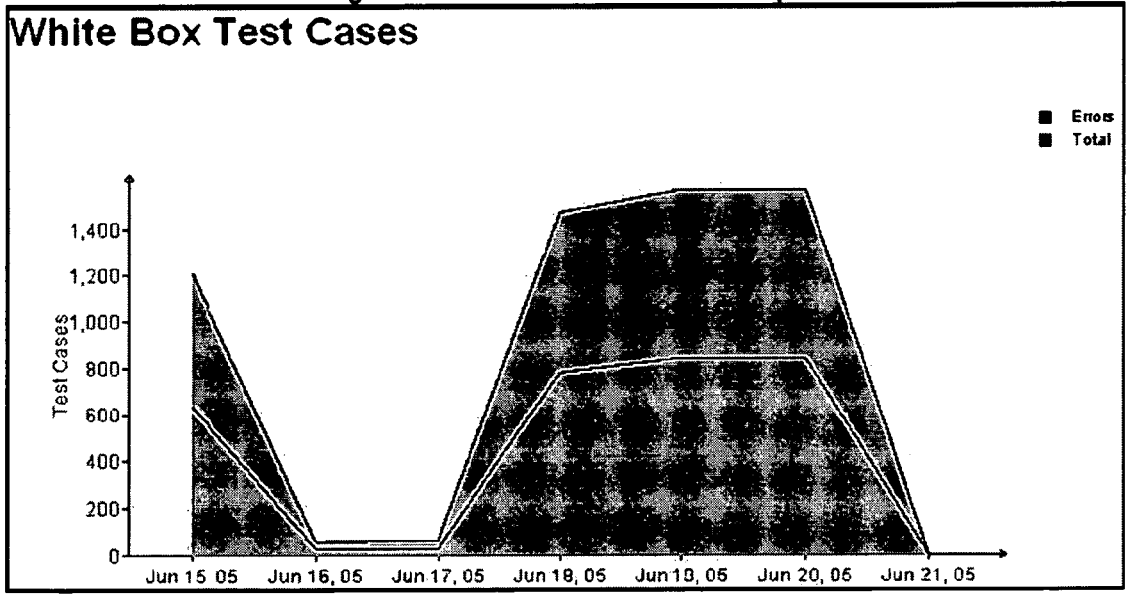
Figure 31: White Box Test Cases Graph

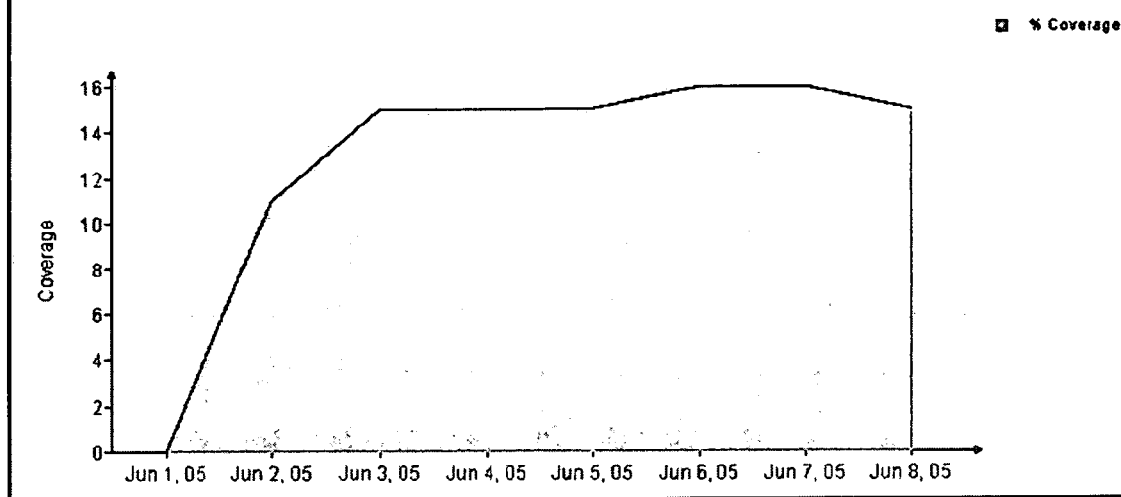
Figure 32: White Box Coverage Graph
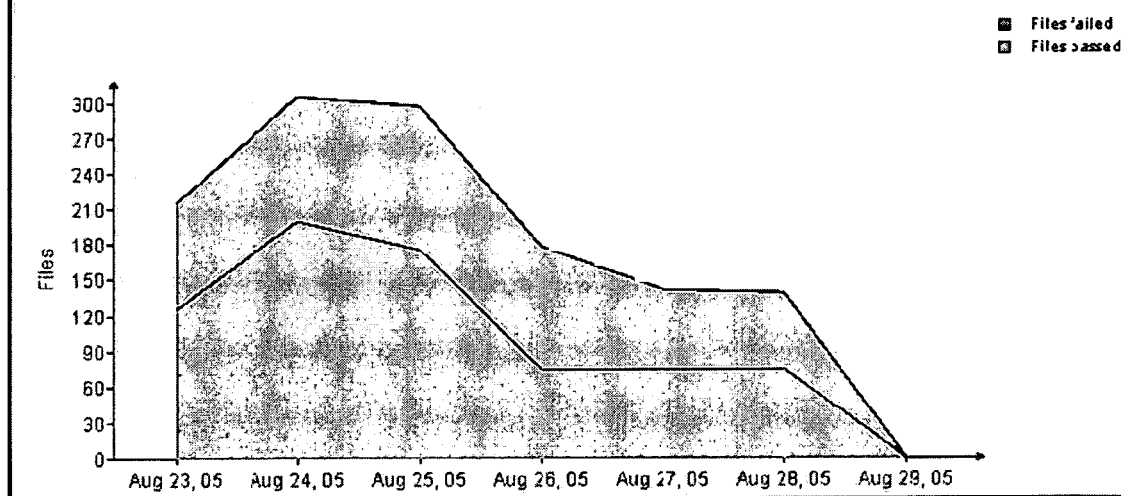
Figure 33: Black Box Files Graph

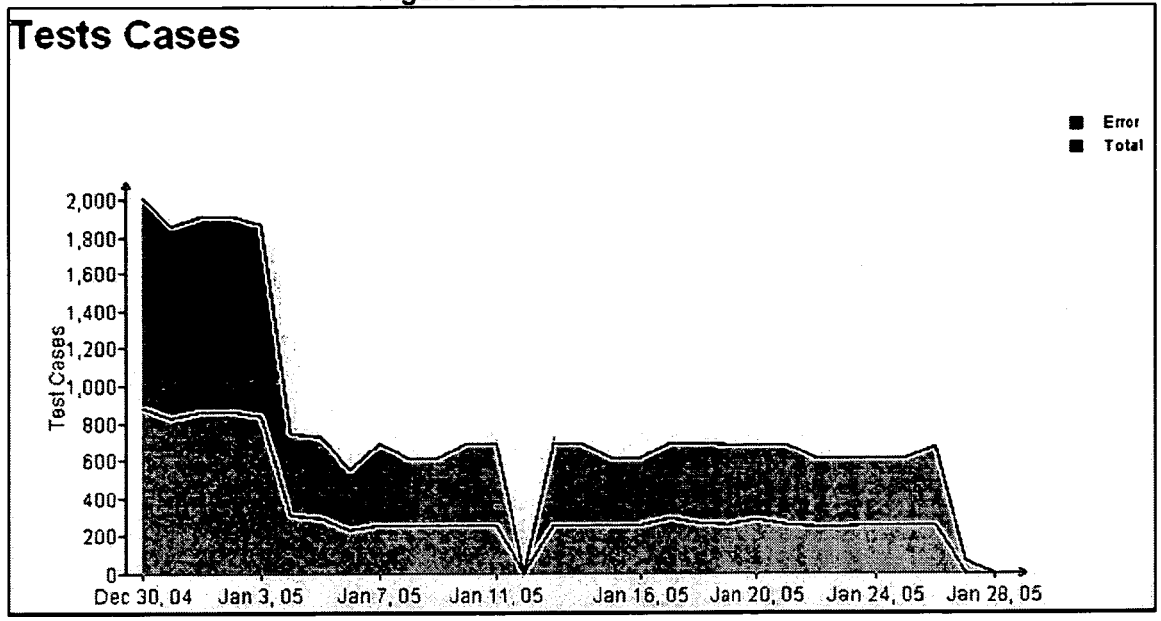
Figure 34: Black Box Test Cases
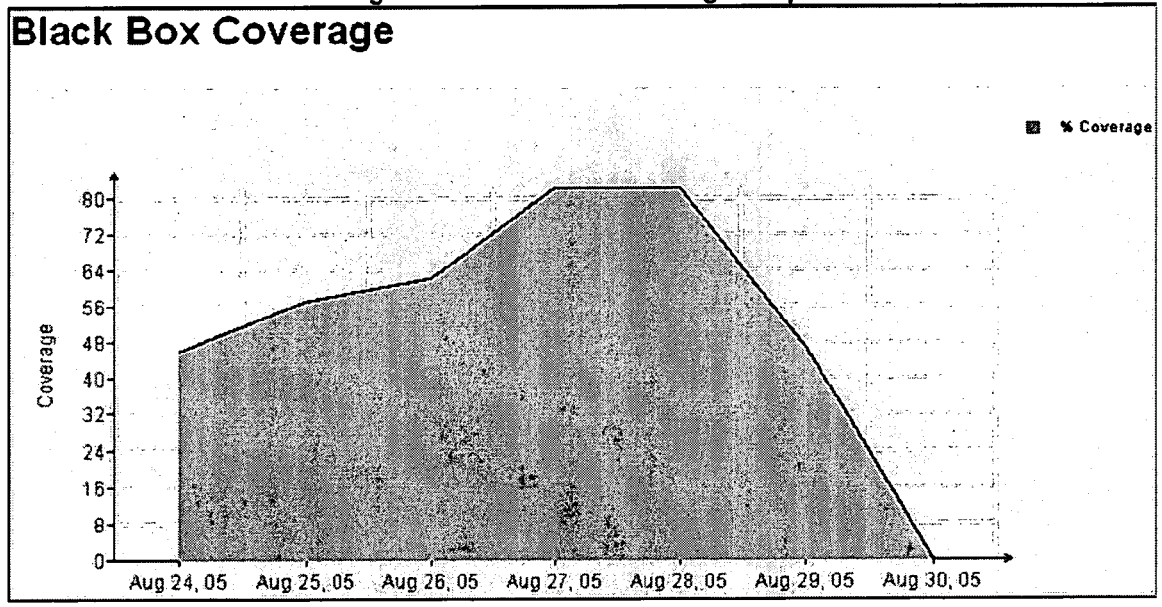
Figure 35: Black Box Coverage Graph

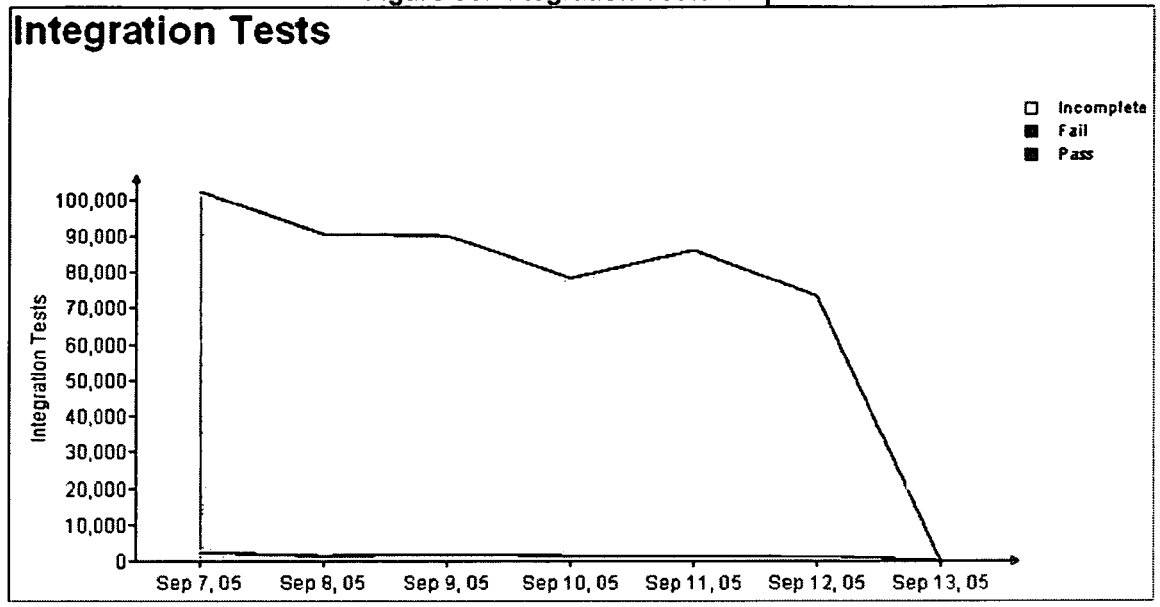
Figure 36: Integration Tests Graph

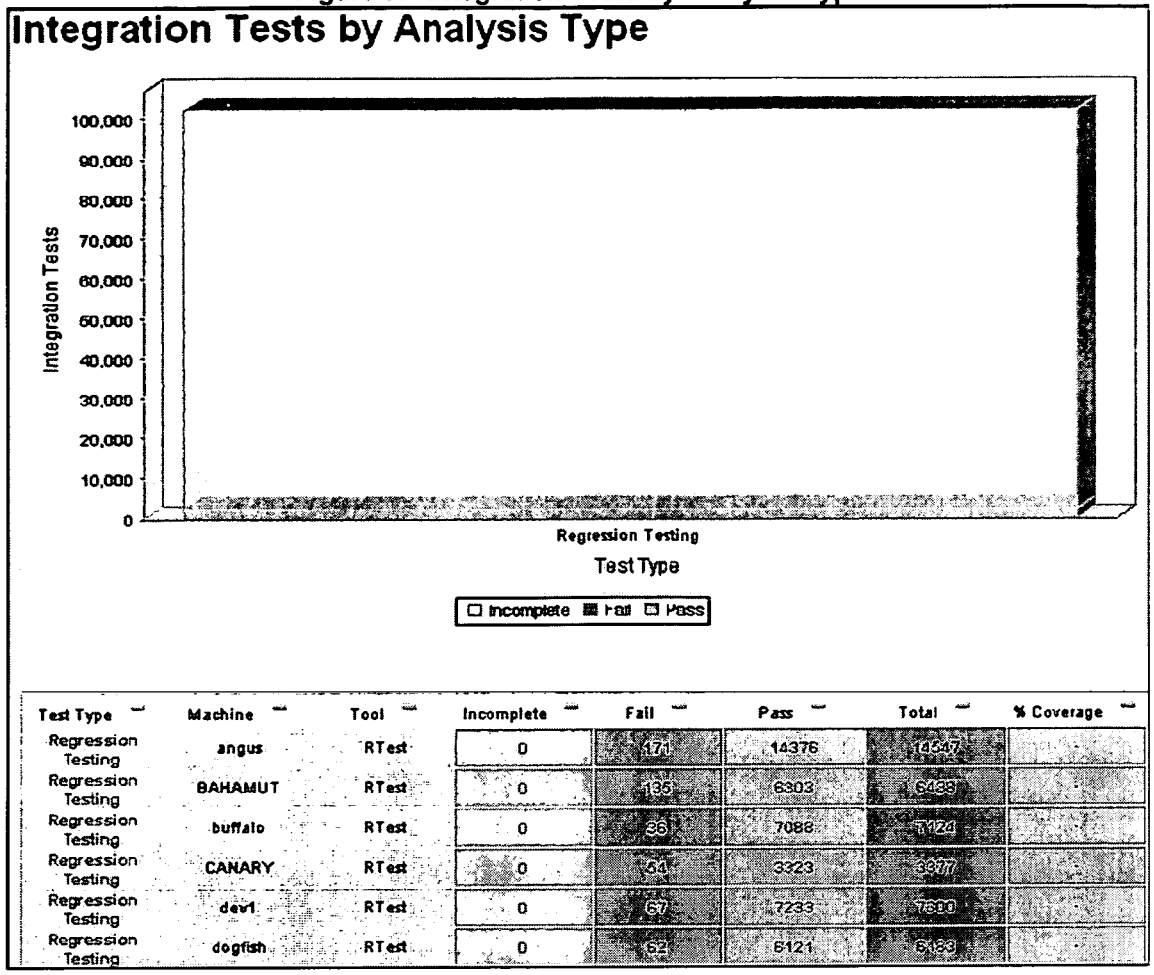
Figure 37: Integration Tests by Analysis Type

Figure 38: Manual Tests for Feature / Requirement: XXX

Manual Tests for Feature / Requirement: 18

Description: LinkTool should check file:\\ URL's
　Product: WebKing
　Module: WebKing Historical results
Manual tests Automatic tests (0)

| Title | Use Case | Author | Comments | Status | Start | Stop |
|---|---|---|---|---|---|---|
| Test 7 for 18 | N/A | grs | N/A | In Progress | Jul 7, 2005 4:05:56 AM | N/A |
| Test 6 for 18 | Use Case 1 | grs | N/A | In Progress | Jul 7, 2005 3:00:28 AM | N/A |
| Test | Use Case 1 | grs | Test passed. | Success | Jul 1, 2005 7:32:54 AM | Jul 1, 2005 7:48:19 AM |
| Test4 | N/A | grs | N/A | In Progress | May 25, 2005 7:59:50 AM | N/A |
| Test3 | N/A | grs | Enter important comments about the test here | In Progress | May 24, 2005 11:53:40 PM | N/A |
| Test1 | N/A | grs | Enter important comments about the test here. | In Progress | Mar 29, 2005 3:12:06 PM | N/A |
| Test1 | N/A | grs | Enter important comments about the test here. | In Progress | Mar 29, 2005 3:11:22 PM | N/A |

Add new manual test

☐ choose Use Case: [Use Case 1 ▼] [Add Use Case]

[Add]

Figure 39: Manual Tests for Feature / Requirement: XXX

Manual test
   Title: Test 1 for 46726
   Start:     3:40:58 PM

*Execute test following the Use Case. Add comment if it is necessary.*
*Then assign appropriate status and finish test by clicking the 'Stop' button.*

Use Case: GRS Use Case 1

1) Log in as admin user.

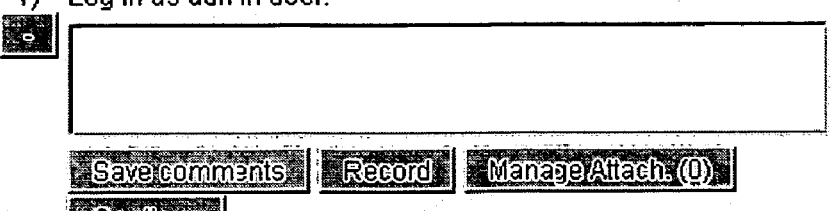

2) Click Manager Dashboard icon.

*Screenshot is required*

3) Select project GRS21.

4) Select 1st RED balloon along confidence factor (6%, May 23, 05).

5) Select Project Score graph.

6) Go back.

7) Select Features Request graph.

Comment:

[Save comments]

Status: [In Progress ▼]
Stop: [Stop]

SYSTEM AND METHOD FOR GLOBAL GROUP REPORTING

CROSS-REFERENCE TO RELATED APPLICATION

This patent application claims the benefit of the filing date of U.S. Provisional Patent Application Ser. No. 60/629,134, filed on Nov. 18, 2004 and entitled "SYSTEM AND METHOD FOR GLOBAL/GROUP REPORTING," the entire content of which is hereby expressly incorporated by reference.

FIELD OF THE INVENTION

The present invention relates generally to computer software; and more particularly to an efficient and flexible reporting system and method.

BACKGROUND OF THE INVENTION

The problem of writing error-free computer programs has plagued programmers since the beginning. Sophisticated schemes for automatically discovering program errors and bugs of all kinds, including lexical, syntactic, semantic and logical, have been developed.

Most of software developers understand that the longer an error is allowed to remain in the software before it is discovered, the more expensive it becomes to fix. With vigilant testing from the earliest phases of the software lifecycle, software development teams find errors earlier and reduce the likelihood of discovering the error further down in the software lifecycle. Early detection reduces the cost of fixing each error, which in turn, reduces the cumulative cost of fixing the thousands of errors that typically surface in the course of a project. Considering the costs an organization would incur if even few errors were not found until late in the lifecycle, it is clear that early detection of errors yields a substantial cost benefit.

When a software development team has an automated and comprehensive method for preventing errors throughout the lifecycle of the software product, the team typically prevents hundreds or even thousands of errors from occurring throughout a project. As a result, the team has significantly fewer errors to find and fix, which translates to reduced costs and a more rapid, efficient development process.

To enable the process of early error detection and error prevention a global and comprehensive reporting mechanism is needed. Different people involved with the software development cycle need to know where the errors are occurring, how and why they are occurring and what specific area needs more attention to prevent the errors from occurring. A reporting feedback loop across the software development lifecycle, from design to deployment, is needed if errors are to be prevented at every stage. This means understanding where the process is working and where it needs to be fine-tuned.

SUMMARY OF THE INVENTION

The present invention is an efficient and flexible collecting, correlating AND reporting system and method. In one embodiment, the invention is a method and system for collecting and correlating information about development of a computer software. The method and system include collecting data from a plurality of software tools during each point in lifecycle of the computer software; storing the collected data in a database; and correlating the stored collected data to monitor the development of the computer software.

In one embodiment, the invention is a method and system for collecting and correlating information about development of a computer software. The method and system include collecting data from a plurality of software tools during each point in lifecycle of the computer software; collecting data from activities of a plurality of assigned roles responsible for the computer software from respective computers of the plurality of assigned roles; and displaying respective portions of the collected data in a graphical user interface (GUI) customized for a respective role.

BRIEF DESCRIPTION OF THE DRAWINGS

FIG. 5 illustrates an exemplary Project Score graph depicting an overall status of a project, according to one embodiment of the present invention;

FIG. 6 illustrates an exemplary Feature Requests graph, according to one embodiment of the present invention;

FIG. 7 depicts an exemplary Bugs graph, according to one embodiment of the present invention;

FIG. 10 shows an exemplary Confidence factor table for Coding Standards, according to one embodiment of the present invention;

FIG. 11 illustrates an exemplary code Base Size graph, according to one embodiment of the present invention;

FIG. 12 depicts an exemplary Source Code Statistics graph, according to one embodiment of the present invention;

FIG. 13 displays a Source Control Summary, according to one embodiment of the present invention;

FIG. 14 illustrates an exemplary Test graph, according to one embodiment of the present invention;

FIG. 15 illustrates an exemplary Unit Test Coverage graph, according to one embodiment of the present invention;

FIG. 16 shows an exemplary Feature Request with Test Cases graph, according to one embodiment of the present invention;

FIG. 17 illustrates an exemplary Bugs graph, according to one embodiment of the present invention;

FIG. 18 illustrates an exemplary Manual Test Efforts graph, according to one embodiment of the present invention;

FIG. 19 illustrates an exemplary Source Code Statistics graph, according to one embodiment of the present invention;

FIG. 20 illustrates an exemplary Coding Standards Violations graph, according to one embodiment of the present invention;

FIG. 21 illustrates an exemplary Test Cases graph, according to one embodiment of the present invention;

FIG. 22 shows an exemplary Test Cases Detailed Report, according to one embodiment of the present invention;

FIG. 23 shows an exemplary Most Recent Results table, according to one embodiment of the present invention;

FIG. 24 shows an exemplary Drop Grade graph, according to one embodiment of the present invention;

FIG. 25 illustrates an exemplary Errors by Category graph, according to one embodiment of the present invention;

FIG. 26 illustrates and exemplary Errors by Category Detailed Report graph;

FIG. 27 illustrates an exemplary Errors by Severity graph, according to one embodiment of the present invention;

FIG. 28 depicts an exemplary Errors by Severity Detailed Report graph, according to one embodiment of the present invention;

FIG. 29 depicts an exemplary Coding Standards Violations by Violation Type graph, according to one embodiment of the present invention;

FIG. 30 illustrates an exemplary White Box (Unit Testing) report, according to one embodiment of the present invention;

FIG. 31 depicts an exemplary White Box Test Cases graph, according to one embodiment of the present invention;

FIG. 32 illustrates an exemplary White Box Coverage graph, according to one embodiment of the present invention;

FIG. 33 illustrates an exemplary Black Box Files report, according to one embodiment of the present invention;

FIG. 34 depicts an exemplary Black Box Test Cases, according to one embodiment of the present invention;

FIG. 35 depicts an exemplary Black Box Coverage graph, according to one embodiment of the present invention;

FIG. 36 depicts an exemplary Integration Tests graph, according to one embodiment of the present invention;

FIG. 37 depicts an exemplary Integration Tests by Analysis Type graph, according to one embodiment of the present invention;

FIG. 38 is an exemplary table for Manual Tests for Feature/Requirement, according to one embodiment of the present invention; and FIG. 39 shows an exemplary display for Manual Tests for Feature/Requirement when manual Test is selected.

DETAILED DESCRIPTION

The system and method of the present invention provides overview of entire software development lifecycle, provides decision support engine for project management, allows estimation of project timelines and budget based upon empirical data, allows evaluation of project quality based upon empirical data. In one embodiment, the invention correlates information from previous projects to estimate progress of a current project (confidence factors) and whether the project in within the budget.

Figure 1:
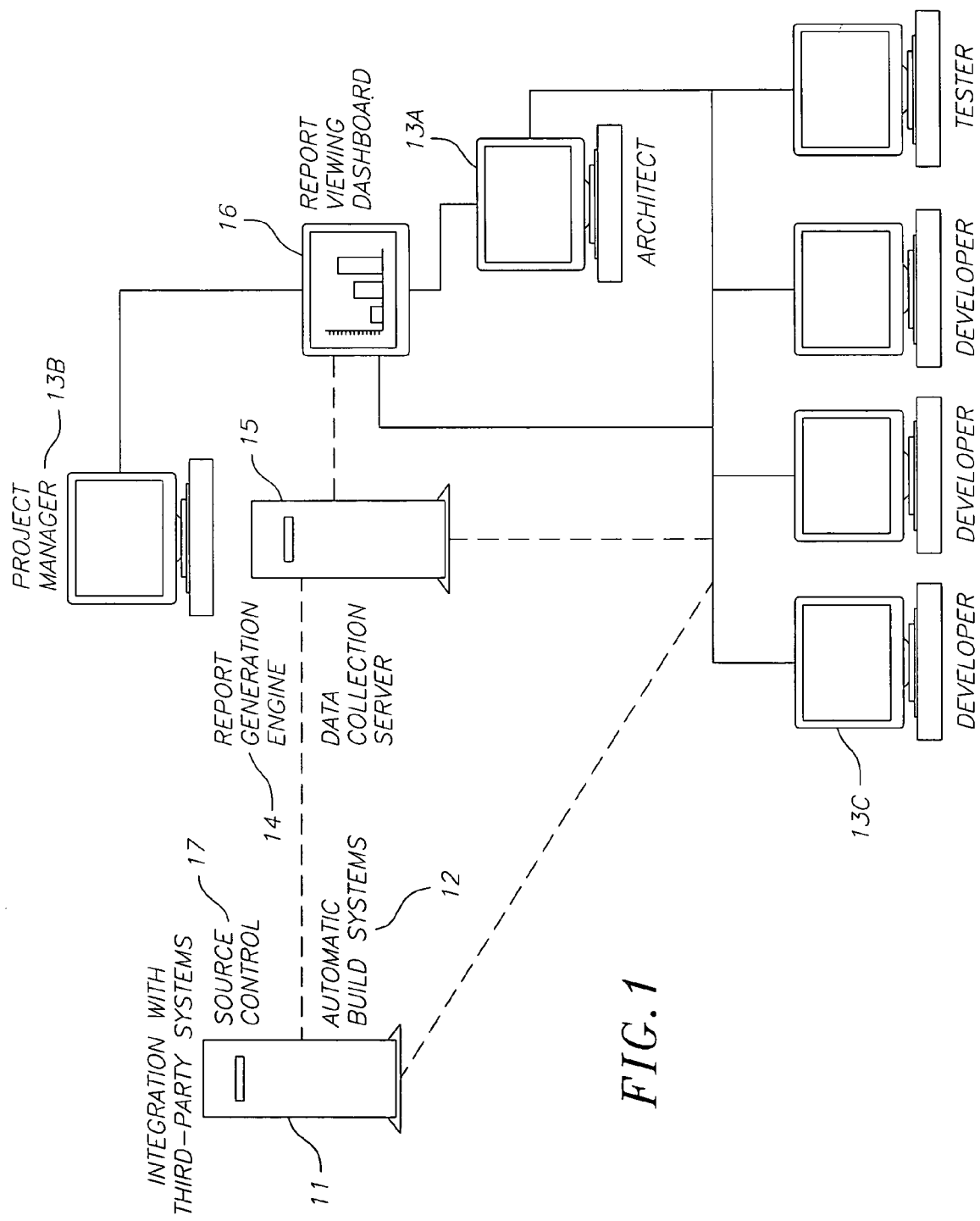
FIG. 1 is an exemplary system and method for automating reports, according to one embodiment of the present invention.

In one embodiment, the present invention is a system and method for automating reports, including software test reports. FIG. 1 is an exemplary system and method for automating reports, according to one embodiment of the present invention. As shown, a Global Group Reporting System (GRS) 14 is an automated reporting structure that provides the data necessary to measure and evaluate how well the verification process, for example, Automatic Error Prevention (AEP) practices are working and disseminates that information to the proper management personnel. When this infrastructure is in place, up to the point of integrating GRS into the system, AEP practices are available throughout the software development lifecycle. GRS is capable of gathering useful and usable data from each point in the software lifecycle, storing the data in the data collection server 15, and distribute the data through reports to the roles and individuals to keep the development process running at its peak efficiency. The reports may be viewed by individuals 13a, 13b, and/or 13c, with different roles in a customized graphical user interface, for example, a report viewing dashboard 16. The data may be gathered from third party tools using third party tool interface 11, the build systems 12, and/or the source control 17. The nightly builds typically run without any human intervention.

Figure 2:
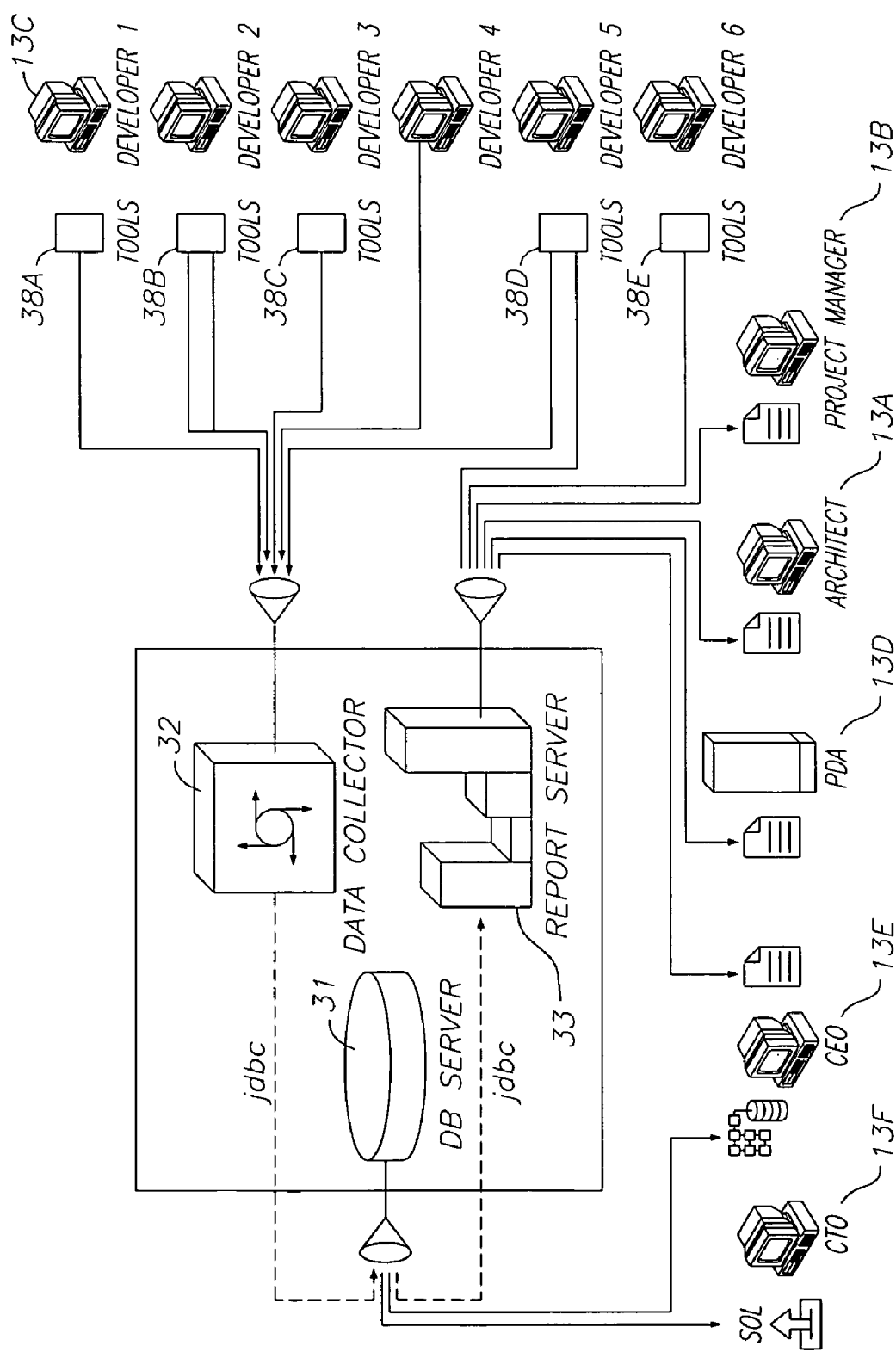
FIG. 2 is an exemplary block diagram of a global group reporting system (GRS), according to one embodiment of the present invention.

FIG. 2 illustrates a block diagram of a global group reporting system (GRS), according to one embodiment of the present invention. GRS includes several functional parts. A database 31 (for example, relational database) stores information from executions of different testing tools, and data from various software tools and third party interfaces. All collected information is stored in the database and used for statistical analysis and historical system behavior. A data collector 32 receives data from different software tools, and third party interfaces. A reporting engine (server) 33 uses a web-based interface to offer the user a variety of statistical reports for data collected. In addition, the engine can gather information from other sources, such as a bug tracking system, and correlate all collected data into a single unit. The reporting engine 33 is capable of generating predefined views and reports for each roles, customizable views, and configurable graphical user interfaces (GUI) for each role. Third party tools can easily be adopted to send data to the collector as well. Prepackaged reports can be customized to emulate individual systems within the software development lifecycle.

Data from testing and monitoring tools 38a-38e (for example, Jtest™, C++ TeSt™, WebKing™, SOAtest™, CodeWizard™, DataRecon™, SOAPbox™, and WebBox™, from Parasoft Corp.®) is retrieved by the data collector 32 and stored in the relational database 31. In one embodiment, access to the database is through a set of standard reports targeted for the various roles (e.g., architect, project manager, developer, and so on) within the different AEP solutions that GRS supports (Java Solutions, Web Development Solutions, and so on). The GRS of the present invention is capable of interfacing with developers 13c, architect 13a, project manager 13b, a PDA 13d, CEO 13e, CTO 13f, and the like.

In one embodiment, access to GRS reports requires authorization with a login and password. Each GRS user account has a set of roles assigned to it. Once inside the system, the users are presented with a configurable dashboard that lets them visualize the status of their software development lifecycle. For example, a user with an appropriate access right can choose to view the behavior of the entire project, a development group, individual testers or programmers.

GRS tool provides flexibility by customizing prepackaged reports to a given role, which allows the user to view different aspects of their development process, or by tagging their data with various attributes that are used as filters when analyzing development and test results.

Attributes are used to drill down through the data using standard reports. If further customization is needed, a reports administrator can assign new attributes to a name, either a fixed or variable value, depending upon the types of reports needed for analysis, resulting in total customization of the scope of reports available. The administrator interface is shown in the graphic below.

GRS allows slicing through test data in a variety of different ways, maximizing the understanding of how well the application is progressing towards release, what tasks remain, and any problems that have arisen during testing. When a standard report is accessed, it may be shown in graphic form.

The user can click on this graphic to retrieve the data in an easy to read text format. Standard reports also include multiple data sets collected from different runs of tools.

For example, for coding standards analysis, verification results or reports show adherence to coding rules and which rules were broken; for unit testing, reports show which test cases were run and provide information on test coverage; for bug tracking systems, reports can indicate the pace of bugs fixing, whether bugs are increasing or decreasing, and what software components are most responsible for bugs; and for monitoring systems, reports indicate how the monitoring system behaved during a given time period.

In one embodiment, GRS includes two levels of reporting that can be configured by the user. In the first level, the system can be configured to create reports from any activity at the developer desktop. For example, the architect and the developer can be automatically notified that there is a violation that needs to be addressed. This provides an instant report of errors and violations, but no analysis of improvement, relation to other developers, or relation to other projects. This level can provide a snapshot of the activity just completed by the developer.

Figure 3:
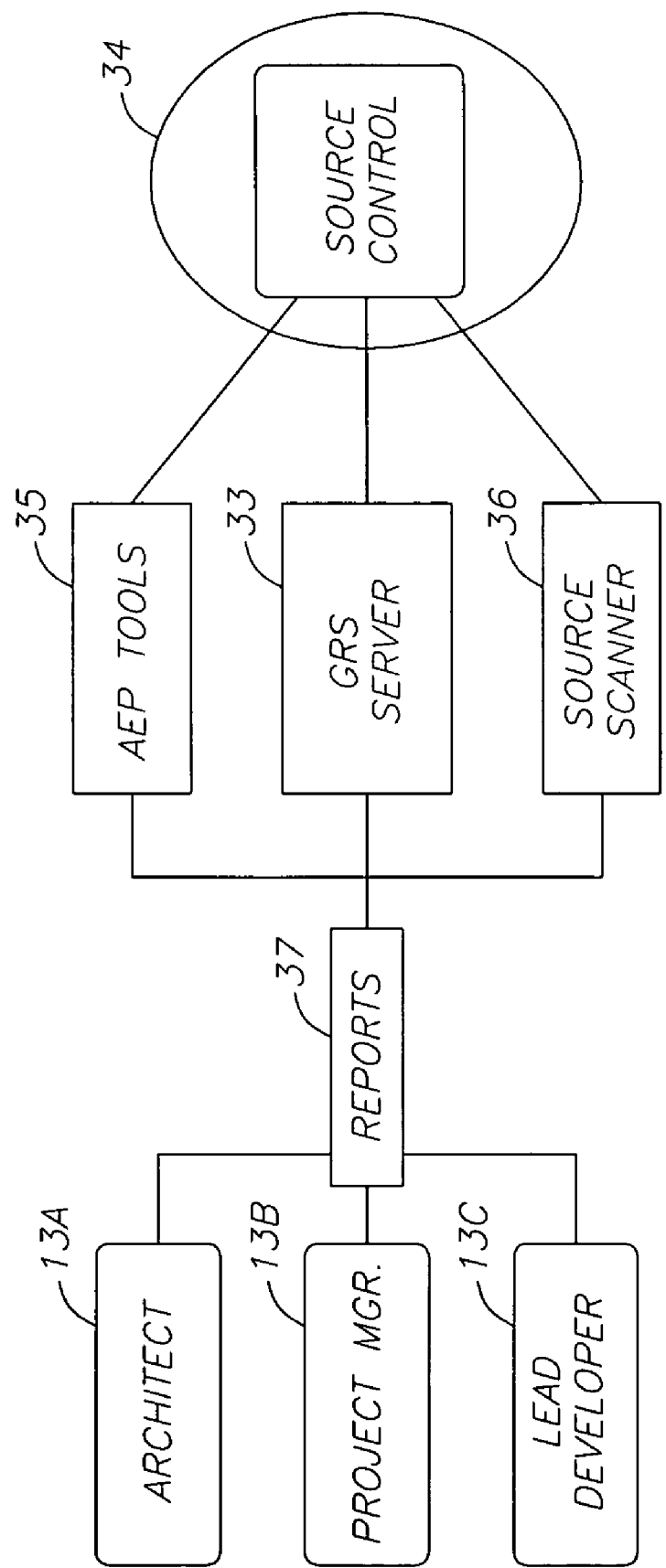
FIG. 3 is an exemplary block diagram of a GRS allowing enterprise reporting, according to one embodiment of the present invention.

In the second level of reporting, GRS allows enterprise reporting, as shown in FIG. 3. In this case, GRS includes an enterprise reporting server 33 that in one embodiment, includes a relational database tied to report processing and publishing engines. Because the server includes a relational database, it allows capturing large amounts of data about the code base and about team activity, and view it in a variety of ways. Those skilled in the art would appreciate that the relational database does not need to be part of the server 33 and can be located in one or more servers. Typically, the server is integrated with the source control system 34. This allows data from source control (attributes such as the specific developer who checked in code that caused a violation) to be combined and correlated with data from all other software tools 35 during each point in lifecycle of a computer software to create a comprehensive view of the system. Server 33 also correlates the collected data to monitor the development of the computer software. In one embodiment, server 33 also correlates collected data from activities of assigned roles responsible for the development of the computer software from the computers of the assigned roles with the collected data from the software tools, for example, to asses validity of their activities.

In one embodiment, the correlated data is used to monitor compliance of an organization with a given regulation, to asses workload, distribution of tasks and performance of users to manage the development process of the computer software, and to manage quality of the development of the computer software. Furthermore, a confidence factor can be generated from the collected data and displayed the in a GUI that is customized for a respective role.

Source scanner 36 scans, for example, the file headers stored in the source control 34, and determines who checked in the file, when the file was checked in, and other similar information. Source scanner 36 then feeds this information to the AEP tools 35 for nightly builds and other tools' usages. The nightly builds run without any human intervention because, as mentioned above, the AEP tools are capable of generating their own test cases, without any prior knowledge of the code. In other words, the AEP tools apply a rule-base system to the code without any human intervention for generating test cases.

The results of the nightly build run is then stored in the database of the GRS server 33. The results are then processed to generate reports 37 and an objective indication of the code quality. In one embodiment, this objective indication of the code quality is a confidence factor, as described below in more detail. The objective indication of the code quality is a quality rating of the entire code that takes into account the verification results of each of the verification tools, the number of test cases run, the success of failure of the test cases, with respective to each developer and the entire development team.

The enterprise reporting server is pre-configured to receive data from many different software tools. The server also automatically receives data from all automatic builds. The server is an open platform that can be configured to collect data from a variety of other systems, such as bug tracking systems, allowing the users to see who's working on code and how many bugs are being reported, as well as view the correlation between bugs and the current development practices. The server can also be connected to existing test suites (such as JUnit™) or those from other testing products that output a text file. As the number of sources for relevant data included in the system are increased, the users' ability to correlate information about the development process, code, and quality will increase. This information can be used to create reports that correlate the number of lines of code to the amount of bugs, the improvement within specific development teams, or even the progress of individual developers. Most importantly, once the enterprise reporting server is in place, the users have an open platform that can be configured to accept data from any variety of tools to help them better manage their entire software lifecycle.

In one embodiment of the present invention, GRS is pre-configured with sets of reports for the various roles (for example, reports for the developers, architect, and/or project manager). In one embodiment, GRS is an open system that can connect to other systems and can accept output from other tools. This means that when used apart from the AEP systems, the general reporting engine can generate customized reports. The reports generated by GRS can correlate information from different phases of the software development lifecycle and support error prevention for the entire lifecycle. For example, information from monitoring can be correlated to particular pieces of developed code in an effort to pinpoint problems and prevent certain errors from occurring.

In one embodiment, a variety of standard reports are included with the enterprise reporting server, accessible using a standard web browser. Based on a login, users are presented with a dashboard (GUI) that shows them relevant information based on their role within the system. Developers are able to view different types of graphs which that show how well they performed on achieving coverage of the rules, which rules where used during statistical analysis, which passed and failed, and where they failed. They can also view which pieces of code are failing the most.

GRS can also correlate information from previous projects to provide confidence factors that help estimate the progress of the current project. Confidence factors use a scale from 0% to 100%, helping to determine how successful the tests have been in analyzing a project, and indicate what types of tests may still need to be conducted. The higher the confidence factor number, the better the software application is working and the more likely it is to succeed after deployment. Ideally, an increase in all statistics related to confidence factor is desirable, as the project matures. These statistics are particularly valuable when integrating and testing various modules into a final product. Confidence factors show, at a glance, if any one module that is added to a project is complete enough to stay in the final build or if it needs further work.

In one embodiment, a Manager dashboard serves as an overview of projects. With a quick glance, managers can see the status of their projects from a high level. Since GRS forecasts projects, managers can look at each project separately and know whether it is going to hit its scheduled milestones. The Manager dashboard provides the managers with the ability to easily focus in on a project from an upper management perspective and spot any potential problems ahead of time.

Although not part of the Manager dashboard, there are some useful graphs that are accessible to managers from an Audit menu such as Drop Grade, Errors by Category, and Errors by Severity, described in more detail below.

Based on the rate of feature requests (FRs), bugs resolved and growth of the confidence factor, GRS can estimate whether a project is on track to be released on time (for example, estimated Project Release Date=Project Release Milestone). If the estimated Project Release Date surpasses the Project Release Milestone, it is marked in the GUI, for example, with a "Project Off Track" label. Information about the feature requests is obtained from any Requirements Management System (RMS). From the information contained in Bug Reporting System, GRS can tell which feature requests are already resolved.

The Bugs and Confidence Factor graphs provide information about the quality of the code. The Bugs graph shows how many bugs are still left in the system and provides an estimate for how long it will take to fix them. The Confidence Factor graph shows the overall quality of the system and whether the quality goals will be achieved.

In one embodiment, a graph on the Manager dashboard lists managers' projects (domestic and offshore), along with an overall status of each. To get a closer look at a project that is in trouble, but still not go into much detail, managers can look at the status of a project's implemented feature requests, fixed bugs, and confidence factor level. Looking at such information gives managers an idea of how well the various parts of a project are behaving. The managers can also see actual values, such as the percentage of reported bugs that are fixed.

Figure 4:
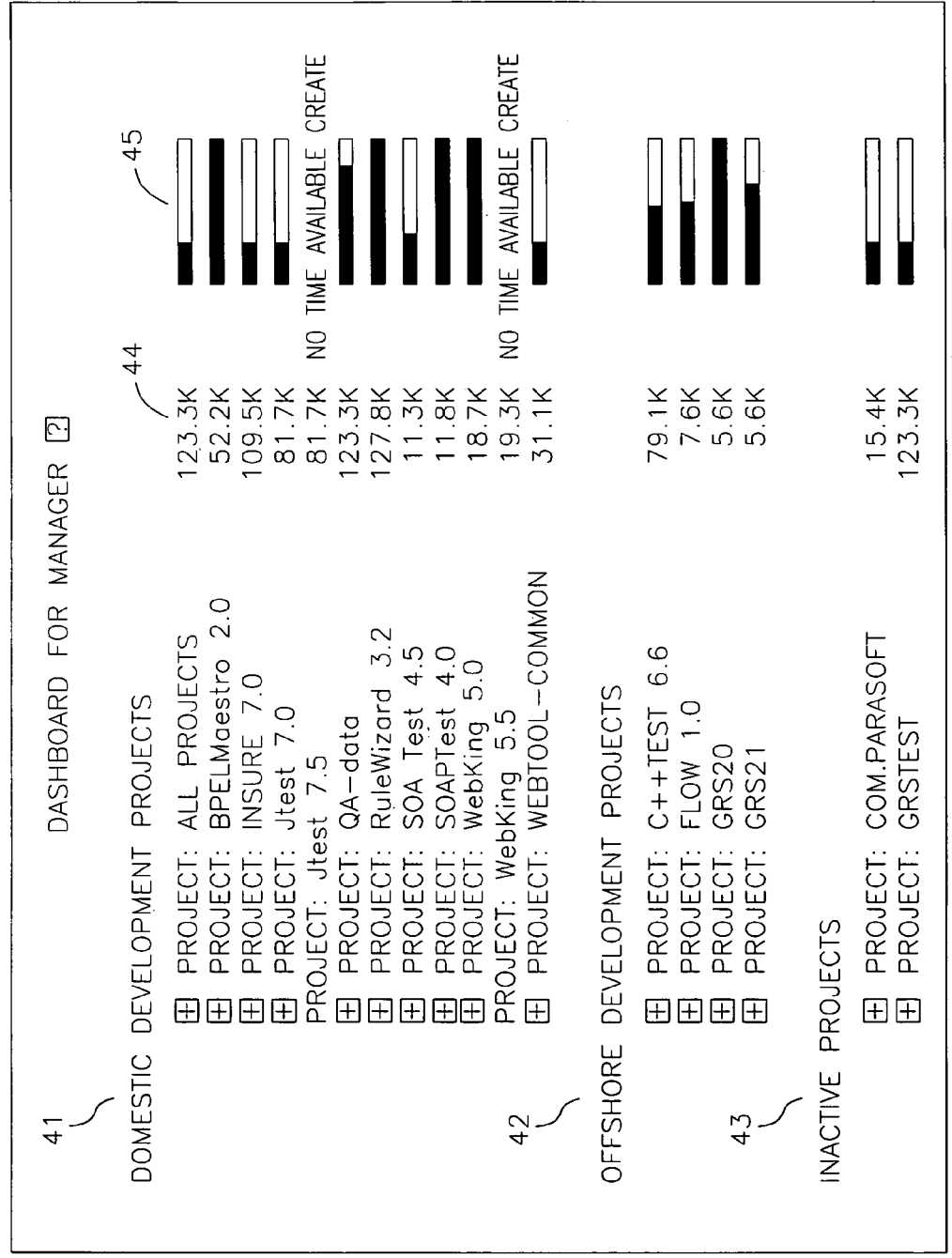
FIG. 4 depicts an exemplary project list in a Manager dashboard, according to one embodiment of the present invention.

FIG. 4 depicts an exemplary project list in a Manager dashboard. As shown, the projects are sorted into three lists: a Domestic Development Projects list 41 (in-house), an Offshore Development Projects list 42 (outsourced), and an Inactive Projects list 43. For each project, access to the following information is provided: project status, project timeline, feature requests (requested and resolved), bugs (reported and resolved), and a confidence factor.

For each project, there are two columns that provide different information. An Efficiency column 44 in the middle reflects team work efficiency. It shows the average number of lines of code written per developer, per project.

In one embodiment, the Efficiency column 44 is in color (not shown) and the different colors of the rectangle represent different ranges of the number of lines of code. The number displayed in the rectangle is computed as follows:

Total number of code lines from the beginning of the project divided by the total number of developers who added or modified these lines during the last 6 months.

Data for the above calculation is collected by a source scanner from CVS files. Next, data is saved to the GRS database and calculated by GRS when a Manager dashboard is invoked.

A Status bar 45 reflects the current status of each project. The length of the status bar indicates how close the project is to completion. In one embodiment, the Status bar 45 is in color and the different colors of the rectangle represent different status levels.

The project list is an at-a-glance means for checking whether a project is on target to be complete by its set deadline. Project details such as project deadlines, parameters, and so on, are input into GRS in order to calculate a more accurate status.

For Inactive projects, the time axis reflects the status from the project start through the project release date. For active projects (domestic and offshore), the time axis reflects the status from the project start through the latest possible release date, the estimated release date, as well as today's date.

A manager can create new timelines and view the details of existing timelines by clicking links displayed on the Project List. The existing milestones for the displayed project can be modified and new milestones can be added by a qualified user. A project can be approved by assigned individuals and/or roles.

An appropriate percentage range may be specified for Features, Bugs, and Confidence Factor. The specified range reflects an acceptable threshold for completed features or bugs, as well as the confidence level that has been reached for the displayed project. It is a range that passes as nearly on target and likely to meet the deadline. If the percentage were to be higher than the specified range, the project would be on target to meet the deadline (for example, indicated by green). If the percentage were lower than the specified range, the project would be off target and not likely to meet the deadline (for example, indicated by red).

When a selected project is opened, the project milestones and status of three main factors (Feature Requests, Bugs and Confidence Factor) that distinctly indicate the progress of the project are displayed. A green line represents "today" and reflects where the project is in its lifecycle. The calculated values that appear in front of the green Today line are based on real data sent to GRS. The data shown after the green Today line is based on trends of past data so that the user can see an estimate of the future progression or regression. In one embodiment, the estimation of the future trends (progression and regression) is performed by GRS when the advancement of project time exceeds some percentage, for example, 30% of the project lifecycle.

FIG. 5 illustrates an exemplary Project Score graph depicting an overall status of the project, for example, past, present and projected status. FIG. 6 illustrates an exemplary Feature Requests graph. The Feature Requests graph depicts how many feature requests exist and how many have been resolved. The lines on this graph represent the following: total number of feature requests, number of feature requests that have been resolved, average tendency of feature request reported (for example, by linear approximation), and average tendency of feature request resolved (linear approximation).

If the two average lines come near each other in future dates and it looks as though the number of feature requests resolved is likely to pass a pre-defined threshold level by the Project Release milestone, then the project is "On Track" and likely to finish on time. Likewise, a Feature Requirements graph shows the number of feature requests and how many are being resolved. The graph looks similar to the graph in FIG. 6.

FIG. 6 is an example of an ideal situation, in which the release is on schedule. This is indicated by a green circle (color is not shown) on the Release line. However, there may be situations where, for example, everything progresses fine through the end of the Design and Coding stages and a realistic release date is estimated based on the history captured in the graph. However, when Beta testing is reached, test cases drop instead of a continuous increase. In this situation, the circle on the Beta line turns either yellow or red (color is not shown), based on the severity of the test cases identified during the drop or scan.

FIG. 7 depicts an exemplary Bugs graph, according to one embodiment of the invention. After looking at feature requests, managers should check out the behavior of the bugs. It is important that the number of bugs resolved reach the pre-defined threshold as the release date approaches. As shown, the Bugs graph provides a high level perspective of what is going on for the project. It shows the number of reported bugs as well as the number of resolved bugs (which is equal to the number of bugs fixed, but not tested).

Typically, the number of reported bugs will begin to rise when testing begins. Soon after, the number of fixed bugs follows. Ideally, when the average lines for Reported and Resolved bugs come near each other and it looks as though the number of bugs resolved is likely to pass the pre-defined threshold level by the Project Release milestone, then the project is "On Track" and likely to be completed on time.

In this case, FIG. 7 shows an un-welcomed situation, where the number of reported bugs grows faster than the number of bugs already resolved and the number of bugs resolved grows too slowly to reach the predefined threshold before the Project Release milestone. This indicates that the threshold of (for example, 60%) will not be met. Therefore, the project is off track.

Figure 8:
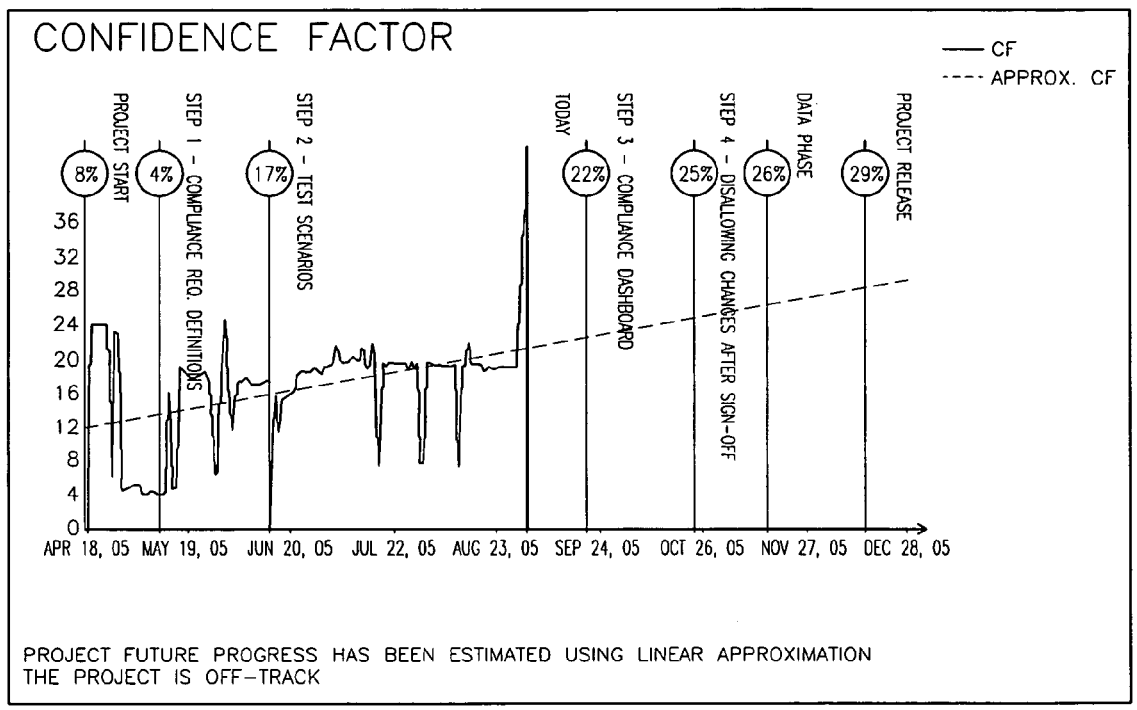
FIG. 8 shows an exemplary Average Confidence Factor graph depicting how the confidence factor is changing, according to one embodiment of the present invention.

FIG. 8 shows an exemplary Average Confidence Factor graph depicting how the confidence factor is changing. Confidence factor provides information about how well the code is actually built. Confidence factors help managers estimate the progress of their current project using a scale from 0% to 100%. The higher the confidence factor number, the better the application is working and the more likely it is to succeed after deployment.

Typically, the confidence factor should be increasing in all statistics as the project matures, but at some point, as the release date approaches, it needs to stabilize. Managers can look at the confidence factor of a project in different date ranges and see if it is really stabilizing as a statistical process. From the trend of the Average Confidence Factor graph, managers can estimate what the confidence factor will be at the release date. Once the confidence factor is steady and rising, it can be estimated accurately.

An Architect dashboard provides details about the code in the projects. In one embodiment, there are a total of eight graphs that are displayed on the first page of the Architect dashboard: Confidence Factor, Code Base Size, Tests, Unit Test Coverage, Tested Feature Requests, Unresolved Bugs, and Manual Test Efforts graphs.

The information about overall confidence in the code that is being built comes from the Confidence Factor graph, from which the confidence level for individual features, functions, files, and developers may be viewed. This level of analysis can be used to take corrective actions.

The Code Base Size graph shows work activity. The user can drill down to the Source reports to obtain more specific information.

The Tests graph contains all of the testing information. In principle, there is no need to separate information for unit testing, coding standards analysis, manual testing and so on. When the user drills down from the Tests graph, different components (AEP practices) contributing to the testing efforts are shown in the Tests by Type graph. The Coverage graph shows coverage by type of test.

The number of bugs is related to the quality of the code and the amount of testing performed. If the manual testing effort is not captured, then the question cannot be answered. If the number of bugs is zero, it might be due to low test efforts, or because there are not any bugs in the code. The Manual Test Efforts graph indicates the reason for the displayed number of bugs.

Figure 9:
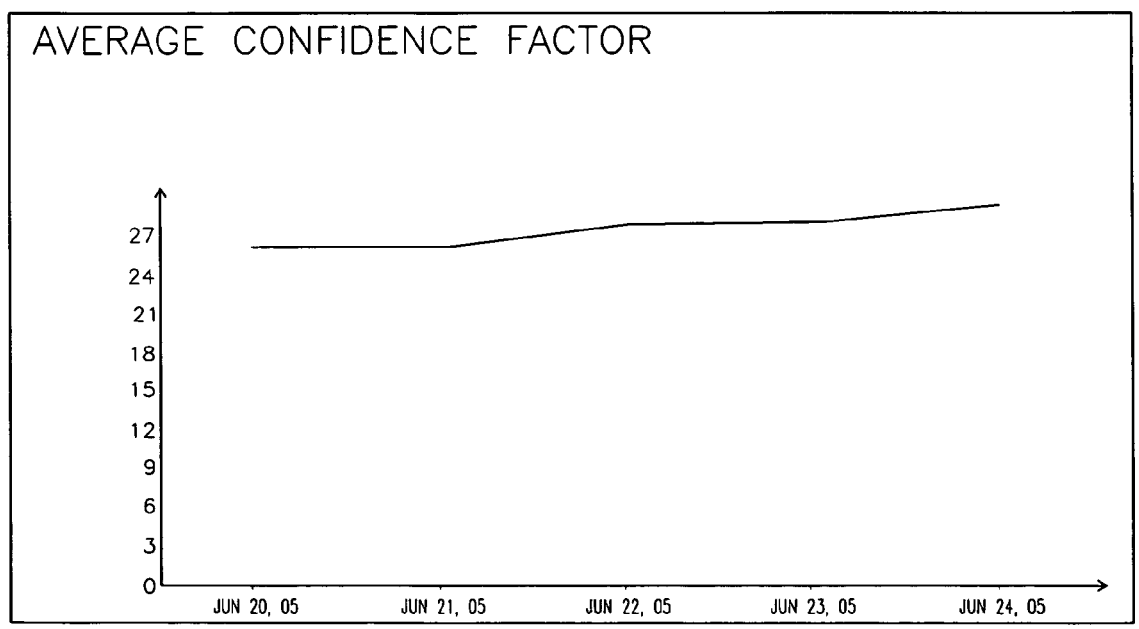
FIG. 9 is an example of an Average Confidence Factor graph, according to one embodiment of the present invention.

FIG. 9 is an example of an Average Confidence Factor graph. The confidence factor is important to architects as it is to managers. The Average Confidence Factor graph shows how the confidence factor is changing over the time of the project. It indicates whether code is stabilizing as the release date is approaching. The graph can be set to a predetermined expectation level. As the release date nears, the confidence factor should change little. If it fluctuates a lot, there is a problem and the code is too sensitive. If the confidence factor number dips drastically after code is checked in, then it is likely that there is a design problem with the system. This number provides an early indication of design problems with the system.

In one embodiment, clicking on a date within the Average Confidence Factor graph displays an Average Confidence Factor by Category bar graph. An Average Confidence Factor table may also be displayed. The Average Confidence Factor Table lists the average confidence factor for the specified period of time. This column is labeled, CF, and is highlighted. The remaining columns list the confidence factor for the following categories for the specified period of time: Coding Standards (CS), Performance (PE), Bugs (PR), White Box (WB), Security (SE), Files Checked In (FCI), Black Box (BB), Maintainability (MA), Files Compiled (FC), Usability (US), Reliability (RE), Compiler Warnings (CW), Integration (IN) Feature, Requests (FR), and Modules Failed (MF).

FIG. 10 shows an exemplary Confidence factor table for Coding Standards. As shown, for each rule that failed, the Summary Information page lists the following details: Rule category, Rule ID, File name, Line, and Developer's name.

FIG. 11 illustrates an exemplary code Base Size graph. The Code Base Size graph shows the amount of code in the code base. When the indicated line rises, it means that code is being added to the code base. You can look at the Code Base Size graph to see whether code is being checked in on a weekly basis. From this graph, one can tell whether existing code is being modified or new code is being added. One can also see the amount of code, files, and lines modified each week. A user can actually look at each of the modifications and see exactly what was modified in the files. A Code Base Size table shows the number of lines of code added to source control, for each listed date.

FIG. 12 depicts an exemplary Source Code Statistics graph. The Source Code Statistics graph shows the number of revisions that were made to source control files associated with a specified project (or all projects) each day during a specified date range. From the Source Code Statistics graph, one can scroll down to view the two tables (not shown). A Revisions by User table shows the number of revisions by each user (developer) over a period of time, for example, on a weekly basis. It lists all developers who made revisions to any source control files associated with the specified project(s) during the dates specified in the Left Menu. For each listed developer, the number of revisions made during each listed week and the total sum of revisions made to the files for the displayed weeks are shown.

A Lines Changed (Cumulative) table shows the number of lines revised by each user (developer) over a period of time, for example, on a weekly basis. For each listed developer, it shows how many code lines were changed during each listed week. It shows the total sum of changed lines for the displayed weeks. For each tables, the user can sort data by selecting one of the following options from the Sorting Order dropdown box in the Left Menu: By User/File, By Total Ascending, or By Total Descending.

Also, from the Source Code Statistics graph, one can click on it to display the Source Control Summary, shown in FIG. 13. As shown, the displayed data is listed in three different sections: Files updates, Lines changed, and Tokens changed. The user can change the display mode by clicking either the Files or Directories link. Clicking Files displays a detailed file list, which includes revisions for each project file. Clicking Directories displays a general list of file directories, which reduces the amount of data displayed. Additionally, the user can drill down further to see more detailed data for a specific file, click the appropriate file to open the File Details table. This table shows the history of the selected file, including all the modifications made to that file beginning from the date it was created.

FIG. 14 illustrates an exemplary Test graph. The Tests graph shows the number of failed, passed, and incomplete test cases for all tests that were run, including coding standards analysis, unit testing, regression testing, and the like. The graph is a quick, overall view of a project in its current state. As shown, the Tests graph indicates the number of tests (files) that failed, passed, or are incomplete over a specified time period.

Based on the displayed item and the selected date in the Tests graph, a Tests table shows the following information Date, Number of incomplete tests, Number of failed tests, and Number of passed tests. A Tests by Type report contains a Tests by Type Graph and Recent Logs for Tests. The first item displayed on the Recent Logs page is the Tests by Type graph. It shows the number of tests per type. For each test type, the graph shows the percentage of tests that passed, failed, or were incomplete for the date selected in the Tests graph. The Tests by Type table can be sorted by any of its column headings.

In one embodiment, a Test Groups Details report includes two parts. A Summary section lists all groups that belong to the selected test group. The Summary section also specifies the basic data, such as log ID, test group name, start/stop date, and so on. A Details section lists each group separately, along with related information and lists all tests performed by each group on the selected day. Click any group name link on the Test Groups Details report to drill down to the Test Group Details report.

FIG. 15 illustrates an exemplary Unit Test Coverage graph. As shown, the Unit Test Coverage graph depicts the total percentage of code coverage. It shows how much code was actually tested. The percentage of tested code varies based on the project files. If the user wants to enforce unit testing, she needs to watch what the development team is doing and whether they are adhering to cleaning errors from unit testing. For example, if the user sees that there were two test suites run, and then looks at them to see the coverage of those different functions; she can see coverage on a function by function basis and that some functions are reaching high coverage, some functions are reaching low coverage. This reports depends upon how the test suites were executed.

A Unit Test Coverage table shows the percentage of coverage for each listed drop date. It shows the total number of tested units as well as the number of units left to test. A Unit Tests—Detailed Report—All Files page includes of three parts: Summary Information, Errors Summary, and Detailed Information.

FIG. 16 shows an exemplary Feature Request with Test Cases graph. The Feature Request with Test Cases graph shows the number of features as well as the number of tested features. It allows the user to check whether features are under control. If there's a finite amount, that means that features are being implemented as various issues are handled. The user can click on them to get an idea of how many outstanding features exist and how many were implemented within the past few days. Also, a history of the features can be seen. If the amount of resolved features is increasing, that, of course, is a good sign. It means that features are getting assigned and implemented soon after they are entered into the system. If this is the case, the line in the Features graph should be increasing at a steady rate. A Feature/Requirements table shows the number of feature requests that are fixed, unresolved, not tested, failed during testing, and reported.

FIG. 17 illustrates an exemplary Bugs graph. The Bugs graph shows the number of reported bugs as well as the number of fixed bugs over a specified period of time. The user can click on the bugs to get an idea of how many unresolved bugs exist and how many were resolved within the past few days. A history of how the features were changed may also be displayed. I this case, if the amount of resolved bugs is increasing, it means that bugs are getting assigned and resolved soon after they are entered into the system. If this is the case, the Fixed line in the Bugs graph should be increasing at a steady rate. A Bugs table shows the number of feature requests that are fixed, unresolved, not tested, failed during testing, and reported.

FIG. 18 illustrates an exemplary Manual Test Efforts graph. The Manual Test Efforts graph shows how much work testers accomplished by manually testing code. It also shows the number of hours the specified tester worked and the amount of manual testing that was accomplished during that time. A Manual Test Efforts table shows the amount of time spent on manual testing for selected project(s) and developer(s). A Test Effort by Tester graph includes bars, each bar representing a tester. The bar is divided into colors to represent the percentage of the tester's manual testing efforts spent on various modules for a specific day.

A Developer dashboard provides developers with project information to help them plan their daily tasks. Developers can access information the Developer dashboard. This information includes Source Code Statistics Code Changes, Coding Standards Violations, and Test Cases. The Developer dashboard is individualized and provides a Source Code Statistics graph shows what code was recently modified by a developer. The information contained in the drill down path shows which methods the developer has worked on recently. It also shows how many of them are active, that is, checked out from the repository. Lastly, it shows how many methods were tested.

The Coding Standards and Unit Testing graphs provide detailed information to indicate how well the developer is adhering to coding standards, which rules she is applying to problem areas in her code, and where the focus needs to be. The Unit Testing graph reports which methods were tested, how well, and which ones have errors.

The developer can see detailed information about specific test cases and files, such as how much of each file was modified, and what in the files were modified in the Developer dashboard. When a developer looks at unit tests of code, for instance, she can see which units were tested, how much they were tested, and then can look at the different testing methods. Next, developers can start asking questions about how much code a specific test covered, whether the method was really tested, which test cases were executed for this specific method, what the inputs and outputs were. This gives the developers a good sense for which methods were tested, how much, and whether they are methods that are key to the test case.

In one embodiment, the Developer dashboard includes two sections: a Time Statistics section, and a Most Recent Results section. The Time Statistics section includes three main reports: a Source Code Statistics report, a Coding Standards Violations report, and a Test Cases report.

FIG. 19 illustrates an exemplary Source Code Statistics report (graph). As depicted, the Source Code Statistics report shows the number of revisions that were made to source control files associated with a specified project (or all projects) each day during a specified date range.

FIG. 20 illustrates an exemplary Coding Standards Violations graph. The Coding Standards Violations graph and a corresponding table (not shown) show the number of violations within lines of code.

FIG. 21 illustrates an exemplary Test Cases graph. The Test Case graph provides developers with a means to compare the number of errors detected against the total number of test cases run on the specified date(s). A Test Cases table shows the number of errors along with the total number of test cases run.

FIG. 22 shows an exemplary Test Cases Detailed Report. Based on the displayed item and the selected date, the numbers for total methods, partially tested methods, fully tested methods, methods with possible errors, and methods with errors appear in the Coding Standards Violations by Violation type. To filter the report results, either or both of the Error type and/or Project name are changed from the Left Menu, and the Generate Report button is activated.

FIG. 23 shows an exemplary Most Recent Results table. The Most Recent Results table lists developers who checked in code for the last drop. For each listed developer it shows the number of violations and errors were found. In one embodiment, the Most Recent Results report is recalculated once a day based on administrative settings.

A Tester dashboard provides testers with quick access to details about Features/Requirements and Unresolved Bugs. The Tester dashboard shows testers which features are currently in the system and how many have been tested. The testers can test and retest features as necessary. The features are pulled from the Requirements Management System (RMS). From the dashboard, a tester can find the specific feature to test, begin the test, complete the test, and then record the results. Automatic test cases can be also recorded.

A Feature graph shows the number of features as well as the number of tested features. A Search Features/Requirements page is where a tester can search for existing features/requirements and add new ones. The user can also create use cases for any existing feature/requirement, and then run (and save) manual tests based on those use cases. An Unresolved Bugs graph shows the number of reported bugs as well as the number of fixed bugs over a specified period of time. A Search Bugs page is where the user can search for existing bugs and add new ones. She can also create use cases for any existing bugs, and then run (and save) manual tests based on those use cases.

FIG. 24 shows an exemplary Drop Grade graph. The Drop Grade graph shows the confidence factor of the software being tested. As describes above, confidence factor is a measure of the overall health or robustness of the software. The graph uses color-coded thresholds (color is not shown) to show whether the confidence factor complies to established targets. For example, green indicates the code is good and complies with test targets, yellow indicates the code is poor and barely complies with the targets, and red indicates the code failed and does not comply with targets.

By comparing multiple versions (drops) of an application, the user can easily see trends and determine whether the confidence factor is increasing or decreasing over time. The user can click on a bar representing any drop date to drill down further and view the files with the lowest confidence factor on the selected date sorted by file, developer, function, or feature.

FIG. 25 illustrates an exemplary Errors by Category graph. The Errors by Category graph enables the user to keep an eye on how errors in the code are distributed. Error categories vary based on the tool that sends the report. This graph shows the number of errors sorted by category type. A bar is used to show the total number of errors for each test run within the specified time frame. Within the bar, each error category is represented by a different color to show the percentage of errors that belong to each category.

The user can view errors that belong to the entire development team, a group of developers, or a specific developer. If errors are being resolved, the bar height in the Errors by Category graph will decrease from day to day. From the Errors by Category graph, a user can drill down further to view more details about the errors generated on a specific drop date. Clicking the bar that represents the appropriate date opens an Errors by Category Detailed Reports. The Errors by Category Detailed Report graph, depicted in FIG. 26 shows the number of errors sorted by category type for the selected drop date. Each bar represents a specific type. The user can change the drop date from the Left Menu. Below the graph, for each category type, blocks of details are listed—organized by severity level. The following details are specified File Name, Line number, the Developer, and the Error.

Selecting the File Name column heading opens an Errors by File Detailed Report, and selecting the Developer column heading opens an Errors by Developer Detailed Report. The Errors by File Detailed Reports shows the ten files that contain the most errors. A table that lists all of the files with errors may also be displayed. For each error, the responsible developer, the line number of code on which the error is located, and specific details about the error are listed. At this point the user can click on the Developer column heading to open an Errors by Developer Detailed Report and click anywhere in the Errors by File graph to open a Confidence Factor by File graph.

The Errors by Developer Detailed Report shows a selectable number of developers with the most errors in their files. A table that lists all of the developers who have files with errors may also be displayed. For each developer, the file name, line of code on which the error is located, and specific details about the error are listed.

At this point, clicking the File Name column heading opens an Errors by File Detailed Report, and clicking anywhere in the Errors by Developer graph opens a Confidence Factor by Developer graph.

FIG. 27 illustrates an exemplary Errors by Severity graph. The Errors by Severity graph shows the number of errors based on the severity level. A bar shows the total number of errors. Within the bar, each error severity level is represented by a different color (color is not shown) to show the percentage of errors that belong to each severity level. The report is also a useful means to confirm whether severity errors are being resolved. The bar height in the graph should decrease from day to day to reflect whether errors are being resolved. From the Errors by Severity graph the user can drill down to view more details about the errors generated on a specific drop date by clicking the bar that represents the appropriate date to open an Errors by Severity Detailed Report.

FIG. 28 depicts an exemplary Errors by Severity Detailed Report graph. The Errors by Severity Detailed Report graph is displayed at the top of the page and shows the number of errors sorted by severity for the selected drop date. The user can change this drop date from the Left Menu. Each bar represents one severity level. If, for example, there are five levels of severity, a graph similar to the one shown in FIG. 28 is displayed.

Below the graph, for each severity level (1-5), blocks of details are listed and organized by category. In one embodiment, the following details are specified Filename, Line, Developer, and Error. Clicking the File Name column heading opens an Errors by File Detailed Report, and clicking the Developer column heading opens an Errors by Developer Detailed Report.

In one embodiment, the invention generates and display graphs for coding standards. The set of Coding Standards graphs serves as a means to help the users introduce coding standards into their development team and ensure that coding standards analysis becomes an enduring part of your software development lifecycle. The following two graphs are displayed when the user selects Coding Standards from the Practices menu: a Coding Standards Violations graph, and a Coding Standards Files graph. For all Coding Standards reports, the data displayed is based on the Cutoff Date or date range that you select in the Left Menu.

The Coding Standards Violations graph provides a quick way for developers to see the number of lines in their code that contain violations, and then drill down to view the source of those violations along with the developer who is responsible for that code. A Coding Standards Violations table lists the number of lines of code with violations for each drop date within the specified date range. Clicking a statistic listed beneath the Violations column drills down to the Coding Standards Violations page.

The Coding Standards Violations page has three different views. Coding standards violations data can be displayed in the three following ways: by Violation Type, by File, or by Developers. The Coding Standards Violations by Type graph appears at the top of the page with the violation details listed in a table below it. Each bar in the Coding Standards Violations by Violation Type graph represents one of the top ten violation types with the highest number of reported violations. Beneath the graph in the Details section, a table s is displayed for each violation type displayed in the graph and provides the following information:

File: Name of the file that contains violations.
    Violations: Number of violations detected in the listed file.
    Developers: Login ID of the developer responsible for the violation(s) in the listed file.

To drill down and view more details about the displayed information, click any of the following links from the Details section of the Coding Standards Violations by Type page:

Violation type name: Opens the Coding Standards Violations Details by Violation Type page.
    File name: Opens the Coding Standards Violations Details by File page.
    Developer name: Opens the Coding Standards Violations Details by Developer page.

FIG. 29 depicts an exemplary Coding Standards Violations by Violation Type graph, according to one embodiment of the present invention. The Coding Standards Violations by File graph appears at the top of the page with the violation details listed in a table below it. Each bar in the graph represents one of the top ten files with the highest number of reported violations.

A Coding Standards Violations by Developers graph appears at the top of the page with the violation details listed in a table below it. Each bar in the graph represents one of the top ten developers with the highest number of reported violations. A Coding Standard Violations Details page has three different views and is displayed in one of the following ways based on the link that you click on the Coding Standards Violations by Type page: by Violation Type, by File, or by Developer. Coding Standard Violations Details by violation type is displayed when you click the name of violation type on the Coding Standards Violations by Type page. Coding Standard Violations Details by file is displayed when you click the name of file on the Coding Standards Violations by Type page. Coding Standard Violations Details by developer is displayed when you click the name of file on the Coding Standards Violations by Type page.

All views of the Coding Standards Violations Details reports include of two parts. In a Summary section the user can find the following information:

Violation Type: (Violation Type view only.) Type of rule that was violated.
    File: (File view only.) Click the file name link to view the source code of the file (if available, it means it was already scanned by Source Scanner).
    Path: (File view only.) Folder location to the file, violation type, or developer (based on the open view).
    Developer: (Developer view only.) Name of the developer who is responsible for the listed violation.
    Cut-off date: Date range either set by the user or an administrator (depending on the setup), which is used to filter the data that appears in reports. If no date range has been set, this field is blank and the displayed report is not filtered based on date.
    Date: Date on which tests were run and the listed violations were found.
    Total rules used: Total number of rules used in the tests that were run. Click to open the Coding Standards Rules Used report, which lists all rule IDs.
    Rules violated: Number of rules that were violated. Click to drill down to the Coding Standards Rules Used report that lists violated rules ID.
    Total violations: Total number of violations detected by Coding Standards tests.
    File History: (File view only.) Click to open the File Details page.

In the Detailed Information section of the Coding Standards Violations Details reports the following details about each detected violation are displayed:

Message: Error message of each violation.
    Rule ID: Name of the rule. Click to view a rule description displayed in the browser window.
    Line: (Violation Type and File views only.) Line of the code where the violation was detected. Click to view the source of the file with the violated code line highlighted.
    File: (Violation Type and Developer views only.) Name of the file that contain violations. Click to open the source code
    Developer: (Violation Type and File views only.) Name of the developer responsible for the error. Click the name to view the statistics of that developer.
    Rule Category: (Developer and File views only.) Click to see the Rule Category violations statistic.

A Coding Standards Rules Used page shows the date on which tests were run and the total number of rules used in those tests. It also lists the IDs of all the rules that were used. Clicking any of the listed rule IDs displays more details about it. The details listed include the following information: Description, Notes, Security Relevance, Parameters, Benefits, Drawbacks, Since (Version number since when this rule has been included in tests.), Example, Repair, and References.

A Coding Standards Files graph shows the number of files that failed and the number that passed during the period of time specified in the Left Menu. Beneath the graph is a Coding Standards Files table. For each drop date within the specified date range, it lists the number of files that contain at least one violation (files failed) and the number of files that passed without any violations detected (files passed). Clicking a statistic listed beneath Files failed opens the Coding Standards Violations by File page. Similarly, clicking a statistic listed beneath Files passed opens the Files without Violations page.

A Files without Violations report lists all files that passed coding standards tests. With this report the users can see the following:
   What rules were involved in tests.
   What file passed tests without any violations.
   Who created the file and when the file was created.
   Who modified the file and when the file was modified.
   The Files without Violations page includes two parts. A Summary Information section includes:
   Date: Date on which tests were run and all listed files passed.
   Files: Number of files that passed the tests run on the listed date.
   Total rules used: Total number of rules used in the tests that were run. Click to open the Coding Standards Rules Used report, which lists all rule IDs.
   Files Not Tested: Click to open the Files Not Tested page, which lists all files that were not yet tested by the listed date. It is exactly the same as the White Box Tests—Files Not Tested page, but reflects results of black box testing.
   A Detailed Information section includes:
   File: Lists path location and name of each file that passed the tests run on the listed date. Click to open the Coding Standards Violations Details page.
   Created: Date on which the listed file was created.
   Last Modified: Date on which the listed file was last changed.

FIG. 30 illustrates an exemplary White Box (Unit Testing) report. White Box reports are used to verify that the white box unit testing practice is implemented correctly and that it covers all of the code. The White Box reports help determine the amount of time that you need to finish the implementation of the practice. White box unit testing verifies code construction and robustness. It ensures that system code is tested appropriately and prevents unpredictable behavior that can lead to functionality and performance problems. White box unit testing means that the tests created were not extended by developers. In other words, developers have not added more functional test cases, changed test values, or anything else of the sort. For all White Box reports, the data displayed is based on the Cutoff Date or date range that you select in the Left Menu.

For a selected date range, the White Box Files report shows the number of files that were tested, but failed, as well as tested and passed. For each drop date within the specified date range, a White Box Files table (not shown) lists the number of files that failed or passed white box tests. Clicking a statistic listed beneath Files failed column opens a White Box Tests Detailed Reports, Files Failed page; and Clicking a statistic listed beneath Files passed column opens a White Box Tests—Detailed Reports—Files Passed page.

The White Box Tests—Detailed Reports—Files Failed page includes a Summary Information, an Errors Summary, and a Detailed Information section. The Summary Information section lists the following details about the failed files:
   Date: Date on which the test cases were run.
   Files with failures: Number of files that failed the test cases run on the displayed date.
   Test cases run: Number of test cases run on the displayed date.
   Test cases run failed (Errors): Number of test cases run on the displayed date that resulted in errors.
   Distinct test cases: Number of distinct test cases run on the displayed date.
   Distinct test cases failed: Number of distinct test cases run on the displayed date that resulted in errors.

The Errors Summary section lists each file name along with the number of errors contained in that file. To view details about files that have not been tested, click the Files Not Tested>>> link. The White Box Tests—Files Not Tested page opens.

The White Box Tests—Files Not Tested page lists all the files that were not yet tested by the date of the selected White Box Tests—Detailed Report. The number of untested files on that date is displayed at the top of the page. The following details are listed:
   File: Lists the names of all the files that were untested as of the date displayed at the top of the page.
      Click any file name to open the source code of that file.
      Created: Date that the listed file was initially created.
         Click to open the File Details page.
      Last Modified: Date that the listed file was changed.
         Click to open the File Details page.

For the selected statistic, the Detailed Information section includes tables for each file that contains errors. It lists the following details:
   File: Name of the file that contains errors. Click the name of the file to open the White Box Tests—File Detailed Report and view more details about it.
   Line: Line on which the error occurred. To view the line containing the error in the actual source code of a specific file, click a specific line number. The file source opens with the line containing the error highlighted.
   Error: Type of error.
   Developer: Name of developer or tester.
   Number of Occurrences: Number of times the listed error occurred within the specified file.

The data in the Detailed Information section can be sorted by the following: File, Test cases run, Failed (tests), Coverage, Methods tested, or Methods not tested.

A White Box Tests—File Detailed Report is displayed when a filename on the White Box Tests—Detailed Report—Detailed Information page is selected. The report includes Summary Information, Test Cases Failed, Methods Not Tested, and Methods Tested sections.

The Summary Information section shows the following information for the selected file:
   File: Name of the selected file. Click to open the source code.
   File History: Click to open the File Details page.
   Path: Location of the selected file.
   Date: Date on which the last test cases for the displayed file were run.
   Test cases run: Number of test cases that were run for the displayed file on the displayed date.
   Test cases run failed (Errors): Number of test cases that failed for the displayed file on the displayed date.
   Coverage: Percentage of code covered by the tests that were run.
   Methods tested: Number of methods that were tested for the displayed file on the displayed date.
   Methods not tested: Number of methods that have not been tested for the displayed file on the displayed date.

A File Details page shows the history of the selected file. The displayed graph reflects the change in the number of lines of code from the date it was created through the current date.

The following information is displayed on the File Details page:

File: Folder location and name of the displayed file. Click to open the source code.
Date: Date change was made to the displayed file.
Version: Version number of the displayed file.
User: Developer who made the change to the displayed file.
Lines changed: Number of lines added/removed to/from the displayed file.
Tokens changed: Number of tokens added/removed to/from the displayed file.
Comment: Description entered by developer regarding the change made to the displayed file.

In a Test Cases Failed table, the user can sort test cases data by the following:

Line: Line on which the error occurred. Click to open the source code with this line highlighted.
Error: Type of error that occurred. Click to open the White Box Tests—Testcase/Errors Details.
Developer: Name of the developer responsible for the error.
Method: Name of the method used for the test case.

A Methods Not Tested table lists any methods that were not tested for the displayed file. In order for information to be displayed in the Methods Not Tested table, metrics analysis need to be run. Similarly, a Methods Tested table lists the methods that were used for testing the displayed file. With this report, the user can find out how many test cases were run for each listed method and, of those, how many failed. The method, number of run test cases, or number of errors found can be sorted in the reports.

Details about test cases and errors for each method listed can be viewed in a White Box Tests—Testcase/Errors Details page by clicking the number listed beneath the Test Cases or Errors found columns next to the corresponding method. The White Box Tests—Testcase/Errors Details page shows either test case or errors details, based on a selected link on the White Box Tests—File Detailed Report—Methods Tested page.

Test Case Details include:

File: Name of the selected file. Click to open the source code.
Path: Location of the selected file.
Date: Date on which the last test cases for the displayed file were run.
Method: Name of the method used for the displayed test case(s).

Beneath the summary, more details such as test case name and ID, error message, test case status, category, severity level of the error, the developer who is responsible, the error type, and the line on which it occurred may be listed. To open the source code of the file, click the listed line number link.

Errors Details include:

File: Name of the selected file. Click to open the source code.
File History: Click to open the File Details page.
Path: Location of the selected file.
Date: Date on which the last test cases for the displayed file were run.
Test cases run: Number of test cases that were run for the displayed file on the displayed date.
Test cases run failed (Errors): Number of test cases that failed for the displayed file on the displayed date.

More details such as, test case name and ID, error message, test case status, category, severity level of the error may be listed. Also, the name of the exception, the developer who is responsible, the error type and the line on which it occurred. To open the source code of the file, click the listed line number link. The line that contains the error may be highlighted.

The White Box Tests—Detailed Reports—Files Passed page shows the number test cases that were run on the displayed date and the number of tests that passed. It includes a Summary Information and a Detailed Information section. The Summary Information section lists the following details about the passed files:

Date: Date on which the test cases were run.
Files without failures: Number of files that passed the test cases run on the displayed date.
Test cases run: Number of test cases run on the displayed date.

To view details about files that have not been tested, click the Files Not Tested>>> link. The White Box Tests—Files Not Tested page opens.

The Detailed Information section shows the following data:

File: Name of the selected file. Click to open the White Box Tests—File Detailed Report page.
Test cases run: Number of test cases that were run for the displayed file on the displayed date.
Coverage: Percentage of code covered by the tests that were run.
Methods tested: Number of methods tested for the displayed file on the displayed date.

FIG. 31 depicts an exemplary White Box Test Cases graph. The White Box Test Cases graph shows the total number of test cases and the total number of test cases that failed. In one embodiment, the numbers are absolute values and reflect the noise level of the code. The number of test cases should increase as they are built for the files. The total number of failures should decrease as the errors are cleaned.

To resolve failed test cases, the user can run code against already-created test cases, or recreate test cases. The test type can be changed from the Left Menu. The default view shows all test cases. A White Box Test Cases table shows the number of errors and total number of files for each listed drop date. Clicking the Files Failed column in the White Box Test Cases table opens a White Box Tests—Test Cases Detailed Report. The White Box Tests—Test Cases Detailed Report is similar to the White Box Files Detailed Report.

FIG. 32 illustrates an exemplary White Box Coverage graph. The White Box Coverage graph shows the white box test coverage of files as a percentage. It also shows the actual number of tested units along with the number of units that still need to be tested. If a white box test case is modified to become a black box test case, the line on this graph goes down. However, this graph measures the effectiveness of the white box test suite, and if numbers start to decrease without code moving to the black box, it indicates one of the following: Files are being added without test cases, or Code is impossible to test automatically.

The White Box Coverage graph also measures the effectiveness of the tool to create test cases on its own. For instance, if code is run against already created test cases, then the user should see a delta on the code. The Coverage graph can be filtered (using the Left Menu), based on date and developer. Coverage should increase because files which were not touched have constant coverage.

A White Box Coverage table shows the percentage of coverage for each listed drop date. In parenthesis, it shows the total number of tested units as well as the number of units left to test. Clicking a specific coverage percentage for a listed date in the White Box Coverage table drills down to a White Box Tests—Detailed Report—All Files page. The White Box Tests—Detailed Report—All Files page includes Summary Information, Errors Summary, Detailed Information sections.

The information and tables displayed on the White Box Tests—Detailed Report—All Files page are similar to those displayed on White Box Tests—Detailed Report—Files Failed. However, a [Details] link (circled) is shown, rather than links to the listed files. For details about the information displayed and the drill-downs available on the White Box Tests—Detailed Report—All Files page, click the [Details] link to open a White Box Tests—File Detailed Report.

In one embodiment, the system and method of the present invention includes Black Box reports. Black Box reports are used to verify that the black box unit testing practice is implemented correctly and that it covers the entire code. The Black Box reports help determine the amount of time that a user needs to complete the implementation of the practice. Black box (functional) unit testing provides verification of your code's functionality and pinpoints instances where the module, object, and method do not adhere to the related specification entries.

Black-box testing can also expose security errors and usability errors, depending on the nature of the specification entries. Black box unit testing begins with testing software at its smallest functional point typically, a single class and spans through units and sub-modules on to modules, testing functionality of the appropriate pieces at each stage. Black box unit testing validates whether software works in the manner outlined in the software's specification. The intent is to confirm behavior that is expected from the smallest possible unit of code to the module. Because this type of functional testing verifies each component in isolation and as part of the system, developers can frame or isolate the functionality of each piece and isolate any potential errors that could affect system functionality.

FIG. 33 illustrates an exemplary Black Box Files report. For the selected date range, the Black Box Files report shows the number of files that were tested, but failed, as well as tested and passed. A flat pattern in the graph indicates that the number of functions for the projects are under maintenance. If the line in the graph increase, it indicates that code is being built. The number of functions executed should asymptotically approach the number of functions. From the difference between these two lines, it is possible to estimate how long the project will take to complete. The number of functions with errors should decline, and a "saw" pattern with the base is seen. When the black box test practice is implemented, the "saw" pattern is seen, which indicates errors are being found, code is being fixed, and code is being checked in.

A Black Box Files table lists the exact number of files that failed and passed black box tests. Clicking a statistic listed beneath the Files failed column opens the Black Box Tests—Detailed Report—Files Failed page, and clicking a statistic listed beneath the Files passed column opens Black Box Tests—Detailed Report—Files Passed.

A Black Box Tests—Detailed Report—Files Failed page include similar drill-downs and contains similar type of data as White Box Tests—Detailed Report—Files Failed. Also, a Black Box Tests—Detailed Report—Files Passed page has similar drill-downs and contains the similar type of data as White Box Tests—Detailed Report—Files Passed.

FIG. 34 depicts an exemplary Black Box Test Cases. The Black Box Test Cases graph shows the total number of test cases and the total number of test cases that failed. The test cases that run include those that have post-conditions, assertions, or are verified by hand or written by hand. Over time, the user may want to see that the number of test cases that run are increasing, while the failures are decreasing. There should be zero failures in the test cases.

A Black Box Test Cases table shows the total number of test cases and the number of failed test cases for each listed drop date. The user can click in the Black Box Test Cases table to drill down to a Black Box Tests—Test Cases Detailed Report. The Black Box Tests—Test Cases Detailed report is the same report as the White Box Files Detailed Report. The user can click on any test case listed to drill down to the test case logs for that file.

A Black Box Test Case Log Detailed Report is the same report as the White Box Files Test Case Log Detailed Report. However, it is sorted by the number of test cases, by default.

FIG. 35 depicts an exemplary Black Box Coverage graph. The Black Box Coverage graph shows the black box test coverage of files as a percentage. It also shows the actual number of tested units along with the number of units that still need to be tested. The black box test practice introduces a different concept of coverage. The traditional view is the coverage of the code. It is also important to know how well the functional test suite covers the code. This indicates how well interaction and construction of code have been verified to reflect requirements. More importantly is the requirements coverage. This coverage indicates how well the test suite represents requirements. At minimum, each requirement (represented as a use case) should have at least one test case that covers it. If each use case is considered as a path through the application, then it should be mapped to the path in the code. This is where path coverage is important. From the Left Menu, the user can filter the Coverage graph based on date and developer.

The percentage should increase over time. If it does not, that is an indicator that tests are not being created. A Black Box Coverage table shows the percentage of coverage for each listed drop date. In parenthesis, it shows the total number of tested units as well as the number of units left to test. Clicking a specific coverage percentage for a listed date in the Black Box Coverage table drills down to a Black Box Tests—Detailed Report—All Files page. The Black Box Tests—Detailed Report—All Files page includes Summary Information, Errors Summary, and Detailed Information sections.

The information and tables displayed on the Black Box Tests—Detailed Report—All Files page are the same as those displayed on White Box Tests—Detailed Report—Files Failed. However, the data reflects results of black box tests.

In one embodiment, the system and method of the present invention includes integration tests. Integration tests verify whether the application operates as designed and all parts of the integrated application work together. The test results of third party tools can also be integrated for the integration test reports.

The following two graphs are displayed when Integration is selected from the Practices menu: Integration Tests and Integration Coverage.

FIG. 36 depicts an exemplary Integration Tests graph. The Integration Tests graph shows the number of integration tests that were run per displayed date with specific status (e.g., Incomplete, Fail, Pass). An Integration Tests table lists the number of integration tests that were incomplete, failed, and passed. Clicking anywhere in the graph or table drills down to an Integration Tests by Analysis Type page.

FIG. 37 depicts an exemplary Integration Tests by Analysis Type graph. The graph shows the total number of integration tests run during regression testing on the specified date. A table below the graph (not shown) shows detailed statistics for the selected date. The table lists the number of tests based on the analysis type, machine, tool name, and their final status. The Coverage data is visible if the tool you are using is able to send such information. Clicking a row in the table opens an Integration Test Groups report. The Integration Test Groups report includes a Summary section and a Detailed section.

A Groups table lists all group names sent by the listed tool from the specified machine. Clicking on a specific group name jumps to the detailed section. A Group name table lists all logs sent by the listed tool from the specific machine for the selected name. Clicking on a log row opens a Test Group Details report Test Group Details reports includes a Summary section and a Detailed section. The Summary section provides information about the log, tool, user, and platform. The details section lists the names of tests that failed during the testing process. Clicking a test name opens a Test Details report, which displays summary information of the selected tests and lists all messages sent in the log. Clicking any listed message displays details about the message.

The invention is also capable of displaying an Integration Coverage graph. Integration Coverage is the coverage information sent with the integration attribute, such as coverage information sent from third party tools. The purpose of viewing integration coverage is to see how much of the internal application was verified. Verification of the feature coverage is especially important. The Integration Coverage pages are the similar to Integration Tests with the exception that data reflects integration coverage rather than tests.

The invention is also capable of displaying a Performance graph. The Performance pages are the similar to Black Box Test Cases with the exception that attributes are set to performance. The performance attributes are set through measurements of various information. For instance, WebKing™ and SOAPTest™ Tools measure response time, and if the measured response time is longer than the threshold, then an error is reported. Also, if the limit for total memory usage is set and crossed, then an error is reported.

Two other important benchmarks that are reported include the number of calls to database during test case, and test case total execution time—if it times out, it is reported here.

In one embodiment, a Requirements Management>Features/Requirements menu provides the following functionality: Searching for Features/Requirements, Adding Features/Requirements to Test, Testing Features/Requirements, and Assigning Use Cases to Feature Requirements.

The user can search for features in order to continue creating tests or create new tests. Selecting or entering the appropriate details in one or more of the following fields enables searching for features.

Project: The project with which the feature is associated.
Product: The product of which the new feature is a part of.
Module: The module to which the new feature refers.
Identifier: The unique ID that was assigned to the feature.
Description: Keyword(s) that appear(s) in the description of the feature.

In one embodiment, the GRS of the present invention is connected to a Requirements Management System, which provides the ability to pull imported requirements and descriptions from GRS to see which features need to be tested. In order to manually test the functionality of a feature, it needs to be added to the feature request database.

After a new test for a selected feature is created, it is added to a list (table) of Historical results. If the selected feature has already been tested, the table of Historical results lists all tests created for this feature. A Status column indicates current status of each test (Success, Failure, Incomplete, In Progress). If the status of selected test is In Progress, it means that the test has not been completed yet so the user can edit it as needed. At this point, there are two different ways to manually test the selected (displayed) feature: Testing Without Use Cases, or Testing With Use Cases In one embodiment, the invention provides the capability of using applets. To use an applet, the user needs to have a Java plugin (JRE) installed on her machine. When on the Manual test page, clicking the Record button opens the Java applet in the upper-left corner.

In one embodiment, when applet starts, the user is requested to accept the security certificate. If user does not grant the requested permission, applet will not work. Additional files or images can easily be uploaded.

Use Cases may be assigned to Feature Requirements. Use Cases are pre-defined scenarios typically created by developers or testers and can be used when manual tests are run to test various functionalities. The user can run manual tests based on a use case by assigning Existing Use Cases to Feature Requirements, or assigning New Use Cases to Feature Requirements.

The invention is capable of assisting the users with outsourcing projects. The invention determines if the expected team is working on the code and if the code is being produced at an appropriate rate. By looking at a Code Base Size graph, the user can see whether the outsourcer is truly more productive than her own team would have been. Since a company (Company X) that outsources knows how much they are paying for the outsourcing, they can determine whether they're getting proper return on their investment. Company X can also determine whether they should pay for the time for which they're being charged.

A Code Base Line Statistics graph shows whether check-in of the code is consistent. If the graph shows sporadic, inconsistent check-ins of the code, Company X knows that the team is not fully working on the project. Likewise, in the Revisions by User and Lines Changed tables, the user can see the names of the developers who are checking-in the code. The user can compare those names to the Team that was selected when the contract was set up. If the user sees that the people who are checking-in the code are changing, that indicates that the outsourcer does not have a stable development force. In short, the Code Base Size graph and Code Base Line Statistics graph, along with further drill-downs, can show who is working on Company X's project and how often Company X's project is being worked on.

Moreover, Company X can take a look at the Source Code graph (on the Developer dashboard), and start correlating it with the Tests graph (on Architect dashboard), where both the quantity and quality of the developers' code is shown. Company X can then see whether the outsourcer is giving them the quantity and the quality of people that they expected.

Another potential problem for Company X may be that the outsourced code within the design did not compile. When code does not compile, it cannot be integrated. A Build graph can prevent such an event from happening. The Build graph allows Company X to not only monitor compilations of the code, but also enforce build procedures. They can see what is going on, how much is going on, and how many warnings the compiler is reporting. Further, the present invention can show Company X the responsible person for the warnings so that they can see whether that person adhered to the build procedures. Furthermore, if Company X has not received any unit test cases, they can look at the Coverage graph. If coverage is low or zero, that means that few people or nobody is building any test cases.

FIG. 38 is an exemplary table for Manual Tests for Feature/Requirement, according to one embodiment of the present invention. After the user creates a new manual test for a selected feature, it may be added to the list of Historical results as shown in FIG. 38. If the selected feature has already been tested, the table lists all tests created for this feature. As shown, the Status column indicates current status of each test (e.g., Success, Failure, Incomplete, In Progress). If the status of selected test is In Progress, it means that the test has not been completed yet so the user can edit it as needed.

At this point, there are couple of different ways to test the selected (displayed) feature: Testing Without Use Cases, and Testing With Use Cases. To manually test features without a use case, from the Manual Tests for Feature/Requirement, click the Add button. Clicking a Record button records screen shots that illustrate the test, and clicking a Manage Attachments button manages any attachments. Additionally, an appropriate status can be assigned (Success, Failure, Incomplete, In Progress).

To manually test features without a use case, open the appropriate feature or requirement. From the Manual Tests for Feature/Requirement, click the Add. In a Title field, type a unique and descriptive name to assign to the new manual test and click Start.

FIG. 39 shows an exemplary display for Manual Tests for Feature/Requirement, when Manual Test is selected. At this point, Run the test based on the steps listed in the use case scenario, Record screen shots to illustrate the test, add comments to those screen shots, and manage attachments. Click Continue to go to the next step. Add final comments about the test, and then click Save comments. Assign an appropriate status (Success, Failure, Incomplete, In Progress), and click Stop to complete the test.

To use a Java applet, the user needs a Java plugin (JRE) installed. When on the Manual test page, clicking the Record button opens the Java applet. When the applet starts, the user is preferably requested to accept the security certificate. If user does not grant the requested permission, applet typically will not work. Click the Capture, and then Close.

A Manage Attach.( ) button indicates that the image was captured successfully. Clicking the Manage Attach.( ) button displays the attachment. The following tasks may be performed at this point:

Uploading additional files or images.
Recording additional screenshots using the applet.
Adding and saving comments to attachments.
Refreshing the attachment list, for instance, if the user has not closed the applet window, the user might need to click Refresh to upload screenshots to the Attachments Management The Sarbanes-Oxley Act of 2002 (SOX) presents IT departments with the challenge of creating, maintaining, and archiving company records in an effective, efficient, and economical manner. Below are the concerns and obstacles of a company (Company X), along with the ways in which the present invention can assist them with overcoming such matters.

Company X does both automatic and manual testing. Their greatest challenge with automatic testing is that the code changes, but the scripts do not change. In order to test the code changes, Company X must constantly maintain the scripts. Ultimately, they may end up testing manually. In fact, let's assume about 80% of Company X's testing ends up being performed manually. The only test records they keep are hand-written, step-by-step instructions about what to click. The only proof that Company X has that the instructions are followed properly during testing is the tester's word. There isn't any concrete evidence or record of the steps and the clicks that the tester actually performed. The present invention provides feature tests, which can be added on the Tester dashboard. Testers can record click-by-click action of their test cases in the Tester dashboard.

There are two ways that feature tests can be added to history in the Tester dashboard. Since GRS integrates with record and playback testing tools, any automatic test cases derived from record and playback testing tools can be pulled into GRS. There are two advantages of keeping a history of test cases for features. The first is keeping a record history just in case proof or evidence is ever needed. The second has to do with problem solving. Let's say a feature was last tested on Jun. 11, 2004, for which everything worked. Suddenly, on Jun. 23, 2004, something doesn't work. When the test case recorded on Jun. 11, 2004 is reviewed, all the screens are played back fine. If testers were manually testing without recording the screens, they might not be able to tell what—or when—anything changed between the test on the 11th and the test on the 23rd. With the history that GRS keeps, the recorded screens can pinpoint when the problem occurred so the code can be investigated. As for what part of the code changed, GRS can point the user directly to the specific files where the errors are located to look for what has changed.

There are different levels to project management. For example, the Manual Test Effort graph in the Architect dashboard shows how much testing is happening. Manual test effort can be correlated with the number of bugs, as reflected in the Unresolved Bugs graph. If the manual test effort is low, and there aren't any bugs, however, this could mean that nothing is being accomplished. In other words, the lack of reported bugs is most likely not because the code is flawless, but rather because the code is not being tested thoroughly.

Top level managers might find graphs on the Architect dashboard too detailed for their needs. Such managers typically just want to see the status of their projects. Using the Manager dashboard, managers can see whether their project is on target to meet the scheduled deadline. Managers can drill down to find out details about features, bugs, and confidence factor. It is more likely, though, that the manager will move straight from viewing project status to contacting the architect—bringing any undesirable status to their attention to investigate further.

For instance, maybe Company X has a project that's not going to meet its deadline. After a concerned call from the manager, the architect checks it out. The Tests graph on the Architect dashboard reflects that test cases are failing. The architect can look at the Code Base Size graph to discover that code is not being written. The Test Effort by Tester graph indicates which individuals are not writing tests.

The architect drills down to the Test Effort by Tester table to see just how much testing each individual actually performed. If testers are integrating GRS with a playback and record testing tool, they should record the script changes. That way, the architect can see manual efforts of scripts, tests, and how much time it cost testers to implement.

In one embodiment, the present invention includes Show Source functionality, which provides the ability to view the source code of tested files. As described above, Source code files are listed in Errors by Category/Severity Detailed Reports, Coding Standards Violations Details, and White Box/Black Box Detailed Logs.

When the user clicks the file name link or the code line number link, GRS Report Server connects to the specific file repository and retrieves the source file. The source code of the selected file is displayed in a new browser window. If the user opens the browser window via the line number link, the erroneous line is highlighted.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A method for collecting and correlating information about development process of a computer software from design to deployment, the method comprising:
    collecting data from a plurality of test and monitoring software tools during each point in lifecycle of the computer software;
    storing the collected data in a database; and
    correlating the stored collected data to monitor the development process of the computer software, including whether the development process is within a given budget and within a given efficiency factor,
    collecting data from activities of a plurality of assigned roles responsible for the development of the computer software from respective computers of the plurality of assigned roles; and
    correlating the collected data with the collected data from the plurality of test and monitoring software tools.

2. The method of claim 1, further comprising generating a confidence factor from the collected data, and displaying the confidence factor in a graphical user interface (GUI) customized for a respective role.

3. The method of claim 1, further comprising generating a plurality of graphical user interfaces (GUIs) for displaying portions of the correlated data, wherein each of the plurality of GUIs is drillable for displaying more detailed information on a selected data.

4. The method of claim 1, further comprising assessing workload, distribution of tasks and performance of users based on the correlated data.

5. The method of claim 1, further comprising utilizing the correlated data to monitor compliance of an organization with a given regulation.

6. The method of claim 1, further comprising utilizing the correlated data to manage a process of the development of the computer software.

7. The method of claim 1, further comprising utilizing the correlated data to manage quality of the development of the computer software.

8. The method of claim 1, further comprising estimating a completion data of a project based on the correlated data.

9. The method of claim 1, further comprising estimating whether a project is on budget based on the correlated data.

10. A method for collecting and correlating information about development process of a computer software, the method comprising:
    collecting data from a plurality of test and monitoring software tools during each point in lifecycle of the computer software;
    collecting data from activities of a plurality of assigned roles responsible for the computer software from respective computers of the plurality of assigned roles;
    correlating the collected data from the activities of the plurality of assigned roles with the collected data from the plurality of test and monitoring software tools; and
    displaying respective portions of the collected data in a graphical user interface (GUI) customized for a respective role.

11. The method of claim 10, further comprising generating a project list and providing access to project status, project timeline, feature requests, and bugs.

12. The method of claim 10, further comprising generating a feature requests graph including the number of feature requests, the number of resolved feature requests, average tendency of reported feature request, and average tendency of resolved feature request.

13. The method of claim 10, further comprising generating a bugs graph including number of reported bugs and number of resolved bugs.

14. The method of claim 10, further comprising generating an average confidence factor graph depicting how the confidence factor is changing.

15. The method of claim 10, further comprising generating a list including a confidence factor for one or more of the group coding standards, performance, bugs, white box test, security tests, files checked in, black box test, maintainability, files compiled, usability, reliability, compiler warnings, integration feature, requests, and modules failed for a specified period of time.

16. The method of claim 10, further comprising generating a code base size graph including amount of code, files, and lines modified for a specified period of time.

17. The method of claim 10, further comprising generating a source code statistics graph including number of revisions made to source control files associated with a specified project during a specified date range.

18. The method of claim 10, further comprising generating a test graph including number of failed, passed, and incomplete test cases for executed tests including coding standards analysis, unit testing, regression testing, and the like.

19. The method of claim 10, further comprising generating a unit test coverage graph including total percentage of code coverage.

20. The method of claim 10, further comprising generating a manual test efforts graph including number of hours a specified tester worked, and amount of manual testing accomplished during the number of hours.

21. The method of claim 20, further comprising generating a manual test efforts table including amount of time spent on manual testing for a selected project and a selected developer, and a test effort by tester graph representing a percentage of a tester's manual testing spent on various modules for a specified time period.

22. The method of claim 10, further comprising generating a source code statistics graph including number of revisions made to source control files associated with a specified project during a specified time period.

23. The method of claim 10, further comprising generating a coding standards violations graph including number of violations.

24. The method of claim 10, further comprising generating a test case report to compare number of errors detected against total number of test cases run during a specified time period, the test case report including total methods, partially tested methods, fully tested methods, methods with possible errors, and methods with errors.

25. The method of claim 10, further comprising generating an errors by severity graph depicting number of errors based on the severity level.

26. The method of claim 10, further comprising generating a coding standard violations details report depicting coding standards violations by violations type, by file, or by developer.

27. The method of claim 10, further comprising generating one or more of a white box test report and a black box test report, each including number of tested files, number of failed files, and number of passed files for a selected time period.

28. The method of claim 10, further comprising generating one or more of a white box coverage graph and a black box coverage graph, each including test coverage of files, actual number of tested units, and number of units need to be tested.

29. The method of claim 10, further comprising generating an integration tests graph including number of integration tests that were incomplete, failed, and passed.

30. A system for collecting and correlating information about development process from design to deployment of a computer software comprising:
   a data collector for collecting data from a plurality of test and monitoring software tools during each point in lifecycle of the computer software, and for collecting data from activities of a plurality of assigned roles responsible for the development of the computer software from respective computers of the plurality of assigned roles;
   a database for storing the collected data; and
   a server for correlating the collected data from the activities of the plurality of assigned roles with the stored collected data to monitor the development process of the computer software, including whether the development process is within a given budget and within a given efficiency factor.

31. The system of claim 30, further comprising means for generating a confidence factor from the collected data, and a graphical user interface (GUI) for displaying the confidence factor.

32. The system of claim 30, further comprising a plurality of graphical user interfaces (GUIs) for displaying portions of the correlated data, wherein each of the plurality of GUIs is drillable for displaying more detailed information on a selected data.

33. The system of claim 30, further comprising means for assessing workload, distribution of tasks and performance of users based on the correlated data.

34. The system of claim 30, further comprising means for utilizing the correlated data to monitor compliance of an organization with a given regulation.

35. A system for collecting and correlating information about development process of a computer software comprising:
   means for collecting data from a plurality of test and monitoring software tools during each point in lifecycle of the computer software;
   means for collecting data from activities of a plurality of assigned roles responsible for the computer software from respective computers of the plurality of assigned roles;
   means for correlating the collected data from the activities of the plurality of assigned roles with the collected data from the plurality of test and monitoring software tools; and
   means for displaying respective portions of the collected data in a graphical user interface (GUI) customized for a respective role.

36. The system of claim 35, further comprising means for generating a project list and providing access to project status, project timeline, feature requests, and bugs.

37. The method of claim 1, further comprising generating one or more reports correlating information from different phases of the lifecycle of the computer software to support error prevention for an entire lifecycle of the computer software.

38. The method of claim 10, further comprising generating one or more reports correlating information from different phases of the lifecycle of the computer software to support error prevention for an entire lifecycle of the computer software.

* * * * *

UNITED STATES PATENT AND TRADEMARK OFFICE
CERTIFICATE OF CORRECTION

PATENT NO. : 8,032,863 B2
APPLICATION NO. : 11/282542
DATED : October 4, 2011
INVENTOR(S) : Adam K. Kolawa et al.

It is certified that error appears in the above-identified patent and that said Letters Patent is hereby corrected as shown below:

In the Claims

Column 27, Claim 8, line 53.   Delete the first occurrence of "data"
Insert -- date --

Signed and Sealed this
Fifteenth Day of May, 2012

David J. Kappos
*Director of the United States Patent and Trademark Office*